United States Patent
Mori et al.

(10) Patent No.: US 7,442,734 B2
(45) Date of Patent: Oct. 28, 2008

(54) COATING COMPOSITION AND OPTICAL ARTICLE

(75) Inventors: Katsuhiro Mori, Shunan (JP); Junji Momoda, Shunan (JP)

(73) Assignee: Tokuyama Corporation, Yamaguchi-ken (JP)

( * ) Notice: Subject to any disclaimer, the term of this patent is extended or adjusted under 35 U.S.C. 154(b) by 558 days.

(21) Appl. No.: 10/529,462

(22) PCT Filed: Dec. 4, 2003

(86) PCT No.: PCT/JP03/15558

§ 371 (c)(1), (2), (4) Date: Mar. 28, 2005

(87) PCT Pub. No.: WO2004/050775

PCT Pub. Date: Jun. 17, 2004

(65) Prior Publication Data

US 2006/0071203 A1 Apr. 6, 2006

(30) Foreign Application Priority Data

Dec. 5, 2002 (JP) .............................. 2002-354291
Dec. 24, 2002 (JP) .............................. 2002-372835

(51) Int. Cl.
G02B 13/14 (2006.01)
C08K 5/15 (2006.01)

(52) U.S. Cl. .................. 524/107; 523/105; 359/355

(58) Field of Classification Search ............... 524/107; 523/105; 359/355
See application file for complete search history.

(56) References Cited

U.S. PATENT DOCUMENTS

| 4,435,497 | A | 3/1984 | Irving |
| 5,914,174 | A | 6/1999 | Gupta et al. |
| 6,802,993 | B2 * | 10/2004 | Momoda et al. ............. 252/586 |
| 2004/0220292 | A1 * | 11/2004 | Momoda et al. .............. 522/71 |

FOREIGN PATENT DOCUMENTS

| EP | 467552 A1 | 1/1992 |
| EP | 1130038 A1 | 9/2001 |
| EP | 1433818 A1 | 6/2004 |
| WO | WO 98/37115 A1 | 8/1998 |
| WO | WO 00/36047 A1 | 6/2000 |
| WO | WO 01/02449 A2 | 1/2001 |
| WO | W0-02/28930 A1 | 4/2002 |
| WO | WO-02/28930 A1 | 4/2002 |
| WO | WO-03/011967 A1 | 2/2003 |

* cited by examiner

Primary Examiner—Tae H Yoon
(74) Attorney, Agent, or Firm—Birch, Stewart, Kolasch & Birch, LLP

(57) ABSTRACT

There is provided a coating composition which can be applied to a substrate such as a plastic lens so as to form a photochromic coating layer having good photochromic properties and excellent adhesion to the substrate on the surface of the substrate.

This composition comprises, for example, as monomer components, 0.1 to 20 wt % of monomer having a group which produces a silanol group through hydrolysis such as γ-methacryloyloxypropyltrimethoxysilane and 0.1 to 50 wt % of monomer having at least one oxycarbonyl group in a molecule. The composition can further contain a maleimide compound as a monomer component and further desirably contains an amine compound.

9 Claims, No Drawings

US 7,442,734 B2

COATING COMPOSITION AND OPTICAL ARTICLE

TECHNICAL FIELD

The present invention relates to coating compositions which are suitably used for imparting photochromic properties to optical materials and optical articles comprising optical materials coated with the coating compositions.

BACKGROUND ART

Photochromic glasses are glasses whose lenses develop color quickly and serve as sunglasses when exposed to light including ultraviolet such as sunlight outside and lose color and serve as ordinary transparent glasses when exposed to no such light inside. In recent years, demand for the photochromic glasses are on the increase.

As methods for producing a plastic lens having photochromic properties, a method (hereinafter referred to as "impregnation method") of impregnating the surface of a lens having no photochromic properties with a photochromic compound, a method (hereinafter referred to as "coating method") of forming a layer having photochromic properties (photochromic coating layer) on the surface of a plastic lens, and a method (hereinafter referred to as "kneading method") of obtaining a photochromic lens directly by dissolving a photochromic compound in a monomer and polymerizing the mixture are known. Of these methods, the coating method has an advantage over the other two methods in that in principle, it can impart photochromic properties to any lens substrate easily. For example, in the impregnation method, it is necessary to use a soft lens substrate in which a photochromic compound can be diffused easily, and in the kneading method, it is necessary to use a special monomer composition so as to develop good photochromic properties. Meanwhile, the coating method is free from such a restriction with respect to substrates.

Thus, it can be said that the coating method is an excellent method as a method for producing a photochromic plastic lens. However, a technique for forming a photochromic coating layer which has-satisfactory adhesion to a substrate and to a hard coat layer that is formed on the photochromic coating layer as required and develops good photochromic properties is not yet established.

Heretofore, as the coating method, (i) a method comprising coating the surface of a lens with an urethane oligomer in which a photochromic compound is dissolved and curing the applied oligomer (refer to the pamphlet of International Publication No. WO98/37115), (ii) a method comprising dissolving a photochromic compound in a polymerizable monomer composition comprising a combination of monofunctional, difunctional and polyfunctional radical polymerizable monomers, applying the composition to the surface of a lens and curing the applied composition (refer to U.S. Pat. No. 5,914,174), (iii) a method comprising dissolving a photochromic compound in a monomer composition comprising a combination of at least two difunctional (meth)acryl monomers only, applying the composition to the surface of a lens and curing the applied composition (refer to the pamphlet of International Publication No. WO01/02449) and (iv) a method comprising coating the surface of a lens with a composition comprising N-alkoxy methyl (meth)acrylamide, a catalyst (preferably an acidic catalyst) and a photochromic compound and heat-curing the applied composition (refer to the pamphlet of International Publication No. WO00/36047) are known. However, the above method (i) has problems that the temperature dependency of photochromic properties is high due to the low crosslink density of the obtained photochromic coating layer and that the photochromic compound is eluted into a hard coat solution when a hard coat is formed on the photochromic coating layer. Meanwhile, the methods (ii), (iii) and (iv) have a problem that adhesion between the glass lens substrate and the photochromic coating layer is not satisfactory.

DISCLOSURE OF THE INVENTION

An object of the present invention is to provide a coating composition capable of forming a photochromic coating layer having good photochromic properties and excellent adhesion to a substrate such as a plastic lens, on the surface of the substrate.

Another object of the present invention is to provide a coating composition whose adhesion to a substrate does not deteriorate even after stored at high temperatures and high humidity for a long time.

Still another object of the present invention is to provide optical articles having a cured coating layer of the coating composition of the present invention.

Other objects and advantages of the present invention will become apparent from the following description.

According to the present invention, firstly, the above objects and advantages of the present invention are achieved by a coating composition (hereinafter may be referred to as "first coating composition") comprising: 100 parts by weight of radical polymerizable monomer which comprises:

(A1) 0.1 to 20 wt % of at least one radical polymerizable monomer selected from the group consisting of a radical polymerizable monomer having a silanol group or a group which produces a silanol group through hydrolysis and a radical polymerizable monomer having an isocyanate group, (B1) 0.1 to 50 wt % of radical polymerizable monomer (excluding one containing only an oxycarbonyl group derived from a (meth)acryloyloxy group as an oxycarbonyl group) other than the component (A1) which has at least one oxycarbonyl group in a molecule, and (C1) 30 to 99.8 wt % of another radical polymerizable monomer different from the components (A1) and (B1), (D1) 0.01 to 20 parts by weight of photochromic compound, and either no amine compound or up to 20 parts by weight of amine compound.

According to the present invention, secondly, the above objects and advantages of the present invention are achieved by a coating composition (hereinafter may be referred to as "second coating composition") comprising: 100 parts by weight of radical polymerizable monomer mixture which comprises:

(A2) 0.01 to 20 wt % of maleimide compound, and
(B2) 80 to 99.99 wt % of another radical polymer compound different from the component (A2),
(D1) 0.01 to 20 parts by weight of photochromic compound, and either no amine compound or up to 20 parts by weight of amine compound.

These coating compositions of the present invention have been found based on the following findings (i) to (iii) that have been obtained in the process of studying so as to achieve an improvement of a photochromic coating agent (hereinafter also referred to as "adhesive photochromic coating agent". The coating agent is disclosed in the pamphlet of International Publication No. WO03/011967.) which has been invented by the present inventors as a coating agent capable of providing a coating layer having high adhesion to a substrate and which comprises "a curable composition comprising specific amounts of a radical polymerizable monomer containing a radical polymerizable monomer having a silanol group or a group which produces a silanol group through hydrolysis, an amine compound and a photochromic compound". More specifically, although a photochromic layer obtained by use of the adhesive photochromic coating agent initially shows high adhesion, the adhesion lowers when the photochromic layer is stored at high humidity for a long time, and the coating layer peels off in some cases. Thus, to obtain a coating composition whose adhesion to a substrate does not lower even when stored under such as harsh condition as described above, a number of experiments have been conducted. As a result, the present inventors have obtained (i) the finding that the above objects are achieved by adding a radical polymerizable monomer (excluding one containing only an oxycarbonyl group derived from a (meth)acryloyloxy group as an oxycarbonyl group) having at least one oxycarbonyl group in a molecule or a maleimide compound to the adhesive photochromic coating agent, (ii) the finding that the same effect can still be obtained without containing the above silane based monomer when the maleimide compound is added, and (iii) the finding that in these cases, when an adhesive layer is formed on the surface of a lens substrate in advance, a photochromic coating layer adheres to the substrate without containing the amine compound. The present inventors have completed the above compositions of the present invention based on these findings.

According to the present invention, thirdly, the above objects and advantages of the present invention are achieved by an optical article having a coating layer comprising a cured product of the coating composition of the present invention formed on at least one surface of a light transmittable substrate.

BEST MODE FOR CARRYING OUT THE INVENTION

Description of a coating composition of the present invention The first and second compositions of the present invention can provide a photochromic coating layer having high adhesion to a substrate as in the case of the above adhesive photochromic coating agent, when an adhesive layer is formed on the lens substrate in advance. Of these compositions, compositions containing the amine compound in an amount of 0.1 to 20 parts by weight based on 100 parts by weight of the polymerizable monomer have a characteristic that they can provide a photochromic coating layer which adheres nicely to a substrate without forming an adhesive layer in advance and has high adhesion durability.

Hereinafter, the present invention will be further described. Firstly, the first coating composition will be described.

The radical polymerizable monomer as the component (A1) in the first coating composition is at least one selected from the group consisting of a radical polymerizable monomer (hereinafter may be simply referred to as "silyl monomer") having a silanol group or a group which produces a silanol group through hydrolysis and a radical polymerizable monomer (hereinafter may be simply referred to as "isocyanate monomer") having an isocyanate group.

The radical polymerizable monomer as the component (B1) is a radical polymerizable monomer other than the above component (A1) and is a radical polymerizable monomer (hereinafter may be simply referred to as "ester-linkage-containing monomer") (excluding one containing only an oxycarbonyl group derived from a (meth)acryloyloxy group as an oxycarbonyl group) having at least one oxycarbonyl group in a molecule.

Further, the component (C1) is a radical polymerizable monomer different from the above components (A1) and (B1).

The polymerizable monomer component of the first coating composition comprises 0.1 to 20 wt % of the component (A1), 0.1 to 50 wt % of the component (B1) and 30 to 99.8 wt % of the component (C1). When the content of the component (A1) is lower than 0.1 wt %, sufficient adhesion cannot be obtained, while when it is higher than 20 wt %, a photochromic property such as a developed color density or a color fading rate deteriorates when a photochromic compound is contained. Meanwhile, when the content of the component (B1) is lower than 0.1 wt %, sufficient adhesion cannot be obtained, while when it is higher than 50 wt %, it is difficult to satisfy a photochromic property such as a developed color density or a color fading rate and all physical properties including viscosity and adhesion of the composition, when a photochromic compound is contained. It is suitable from the viewpoint of the effect that the component (A1) constitutes 0.5 to 20 wt %, particularly 1 to 10 wt % of all polymerizable monomers, the component (B1) constitutes 0.5 to 40 wt %, particularly 1 to 30 wt % of all polymerizable monomers and the balance is the component (C1).

Next, the second coating composition will be described. The radical polymerizable monomer as the component (A2) in the second coating composition is a maleimide compound. Further, the radical polymerizable monomer as the component (B2) is a radical polymerizable monomer other than the above component (A2). The radical polymerizable monomer component of the second coating composition comprises 0.01 to 20 wt % of the component (A2) and 80 to 99.99 wt % of the component (B2). When the content of the component (A2) is lower than 0.01 wt %, sufficient adhesion cannot be obtained, while when its content is higher than 20 wt %, the component (A2) is often a solid, so that its solubility to the component (B2) is a problem, and a photochromic property such as a developed color density or a color fading rate deteriorates when a photochromic compound is contained. It is suitable from the viewpoint of the effect that the content of the component (A2) is 0.05 to 15 wt %, particularly 0.1 to 10 wt %, and the balance is the component (B2).

The first and second coating compositions of the present invention can serve as a coating agent capable of forming a photochromic coating layer which has good photochromic properties and remains stuck to a substrate even when stored at high humidity for a long time by containing the photochromic compound in an amount of 0.01 to 20 parts by weight and the amine compound in an amount of not larger than 20 parts by weight based on 100 parts by weight of the total of the radical polymerizable monomer component. Further, when a photochromic lens is produced by use of such a coating agent, the thickness of a photochromic coating layer must be rendered as thick as, for example, about 40 μm, so as to obtain a sufficient developed color density, depending on the content of the photochromic compound. From a coating agent having a viscosity at 25° C. of 20 to 500 cP, a uniform, thick coating layer can be formed easily by a simple method such as spin coating.

Hereinafter, the polymerizable monomers used in the present invention will be further described.

Description of Radical Polymerizable Monomers

1. Description of Component (A1)

(a) Silyl Monomer:

The silyl monomer used as the component (A1) of the first coating composition used in the present invention refers to a compound having a silanol group (≡Si—OH) or a group which produces a silanol group through hydrolysis and a radical polymerizable group. As the silyl monomer, known compounds which satisfy such conditions can be used without any restrictions.

Specific examples of the group which produces a silanol group through hydrolysis in the above silyl monomer include an alkoxysilyl group (≡Si—O—R; R is an alkyl group), an aryloxysilyl group(≡Si—O—Ar; Ar is an aryl group which may be substituted), a halogenated silyl group (≡Si—X; X is a halogen atom) and a silyloxysilyl group (≡Si—O—Si≡). Of these groups, due to reasons such as ease of production of a silanol group, ease of synthesis and storage and little influence of a group detached from a silicon atom by a reaction on the physical properties of a cured product, the alkoxysilyl group or the silyloxysilyl group, particularly an alkoxysilyl group having 1 to 4 carbon atoms, is preferred, and a methoxysilyl group or an ethoxysilyl group is most preferred.

Illustrative examples of the radical polymerizable group in the above silyl monomer include known radical polymerizable groups such as a (meth)acryloyl group {(meth) acryloyl refers to acryloyl or methacryloyl}; groups derived from a (meth)acryloyl group, e.g., a (meth)acryloyloxy group, a (meth)acryloylamino group and a (meth)acryloylthio group; a vinyl group; an allyl group; and a styryl group. When the radical polymerizable group is the vinyl group, allyl group or styryl group, the radical polymerizable group may have a substituent. Illustrative examples of the substituent include an alkyl group or halogenated alkyl group having 1 to 4 carbon atoms such as a methyl, ethyl, propyl, butyl, chloromethyl or trifluoromethyl group; a halogen atom; a cyano group; a nitro group; and a hydroxyl group. Further, when the radical polymerizable group is the (meth)acryloylamino group, an organic group such as a substituted or unsubstituted alkyl, aryl or allyl group may be bonded to the amide nitrogen atom of the group. Of these radical polymerizable groups, the radical polymerizable group in the above silyl monomer is preferably the (meth) acryloyl group or the (meth)acryloyloxy group and more preferably the (meth)acryloyloxy group, from the viewpoints of easy availability and good polymerizability.

Illustrative examples of silyl monomers which can be suitably used in the present invention include compounds represented by the following formulae (1) to (3).

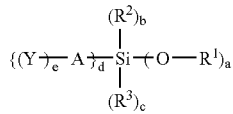
(1)

In the formula (1), $R^1$ is an alkyl group or aryl group, $R^2$ and $R^3$ are each independently an alkyl group, aryl group or acyl group, A is a di- to tetra-valent organic residue, Y is a radical polymerizable group, a is an integer of 1 to 3, b and c are independently an integer of 0 to 2, and d and e are independently an integer of 1 to 3, provided that $a+b+c+d=4$.

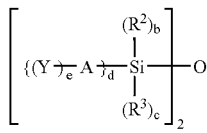
(2)

In the formula (2), $R^2$ and $R^3$ are each independently an alkyl group, aryl group or acyl group, A is a di- to tetra-valent organic residue, Y is a radical polymerizable group, b and c are independently an integer of 0 to 2, and d and e are independently an integer of 1 to 3, provided that $b+c+d=3$.

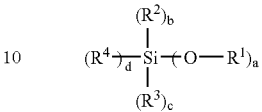
(3)

In the formula (3), $R^1$ is an alkyl group or aryl group, $R^2$ and $R^3$ are each independently an alkyl group, aryl group or acyl group, $R^4$ is a vinyl group, a is an integer of 1 to 3, b and c are independently an integer of 0 to 2, provided that d is an integer of 1 to 3 and that $a+b+c+d=4$.

In the above formulae (1) and (3), $R^1$ is an alkyl group or aryl group. From the viewpoints of ease of production of a silanol group through hydrolysis and storage stability, an alkyl group having 1 to 10 carbon atoms in the principal chain or an aryl group having 6 to 10 carbon atoms constituting the ring is preferred. Further, the alkyl group or aryl group may have a substituent. Illustrative examples of substituents for the aryl group include an alkyl group having 1 to 10 carbon atoms such as a methyl group, ethyl group or propyl group; and a halogenated alkyl group having 1 to 10 carbon atoms such as a chloromethyl group and trifluoromethyl group. Illustrative examples of substituents for the alkyl and aryl groups include an alkoxyl group having 1 to 10 carbon atoms such as a methoxy group, an ethoxy group and a butoxy group; an acyl group having 2 to 10 carbon atoms such as an acetyl group, a propionyl group, oleyl group and a benzoyl group; an amino group and a substituted amino group having 1 to 10 carbon atoms such as a methylamino group, an ethylamino group, a dimethylamino group and a diethylamino group; a halogen atom such as a fluorine atom, a chlorine atom and a bromine atom; a hydroxyl group; a carboxyl group; a mercapto group; a cyano group; and a nitro group.

Specific examples of the substituted or unsubstituted alkyl group having 1 to 10 carbon atoms in the principal chain include methyl, ethyl, propyl, butyl and chloromethyl groups. Specific examples of the substituted or unsubstituted aryl group having 6 to 10 carbon atoms constituting the ring include phenyl, toluyl and xylyl groups.

From the viewpoints of ease of production of a silanol group through hydrolysis and storage stability, $R^1$ is more preferably an alkyl group, much more preferably an alkyl group having 1 to 4 carbon atoms, most preferably a methyl or an ethyl group.

$R^2$ and $R^3$ in the above formulae (1) to (3) are each independently an alkyl group, an aryl group or an acyl group. Illustrative examples of the alkyl and aryl groups include the same groups as those described with respect to the above $R^1$, and preferred examples thereof also include the same groups as those described with respect to the above $R^1$. Further, the acyl group is preferably an acyl group having 2 to 10 carbon atoms and may be an aliphatic acyl group or an aromatic acyl group. Specific examples of the acyl group include acetyl, propionyl and benzoyl groups.

A in the above formulae (1) and (2) is a di- to tetra-valent organic residue, preferably a di- to tetra-valent organic residue having 1 to 30 carbon atoms. The structure of the organic residue is not particularly limited and may have a side chain or a substituent. Further, in the structure, the organic residue may contain a linkage other than a carbon-carbon linkage such as an ether linkage, an amide linkage, an amino linkage, an urethane linkage, a thioether linkage or a sulfone linkage and may also contain an oxa group (ketone carbon). Illustrative examples of substituents which may be contained in the organic residue include halogen atoms such as fluorine, chlorine and bromine atoms, a hydroxyl group, an amino group, a mercapto group, a cyano group and a nitro group.

As the organic residue A, an organic residue having 1 to 10 carbon atoms is more preferred. Specific examples thereof include an alkylene group having 1 to 10 carbon atoms such as methylene, ethylene, propylene, trimethylene and butylene groups; an alkylenedioxy group having 1 to 10 carbon atoms such as methylenedioxy, ethylenedioxy, propylenedioxy and butylenedioxy groups; and the following groups with or without the above substituents are bonded thereto.

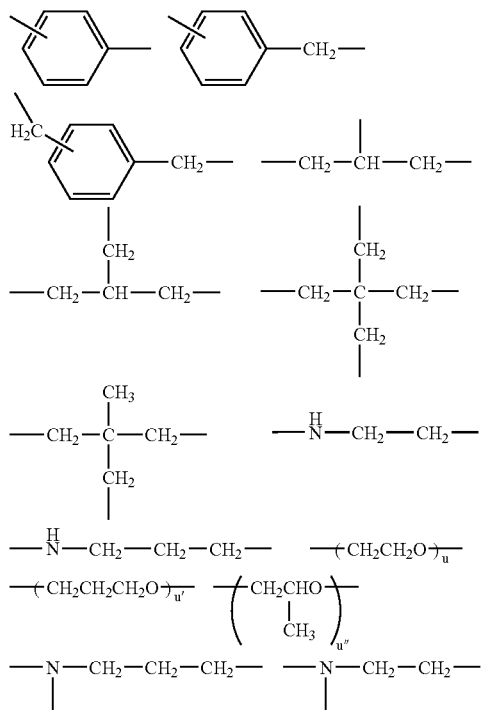

(In the above formulae, u is an integer of 1 to 5, and u' and u" are each an integer of 1 to 3.)

Y in the above formulae (1) and (2) is the same polymerizable group as described above and is preferably a (meth)acryloyl group or (meth)acryloyloxy group.

Of silyl monomers represented by the above formulae (1) to (3), the silyl monomer represented by the formula (1) is preferred. Of the silyl monomers represented by the formula (1), a silyl monomer represented by the following formula (4) is particularly suitable.

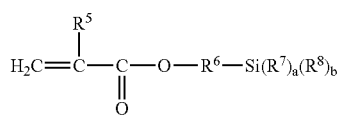

(4)

(In the above formula, $R^5$ is a hydrogen atom or a methyl group, $R^6$ is an alkylene group having 1 to 10 carbon atoms, $R^7$ is an alkoxyl group having 1 to 4 carbon atoms, $R^8$ is an alkyl group having 1 to 4 carbon atoms, a is an integer of 1 to 3, and b is an integer of 0 to 2, provided that a+b=3.)

In the above formula (4), $R^5$ is a hydrogen atom or a methyl group, and $R^6$ is an alkylene group having 1 to 10 carbon atoms. Illustrative examples of the alkylene group represented by $R^6$ which has 1 to 10 carbon atoms in the principal chain include ethylene, propylene, trimethylene and butylene groups. $R^7$ is an alkoxyl group having 1 to 4 carbon atoms, and illustrative examples thereof include methoxy, ethoxy, propoxy and butoxy groups. $R^8$ is an alkyl group having 1 to 4 carbon atoms, and illustrative examples thereof include methyl, ethyl, propyl and butyl groups.

Specific examples of the silyl monomers represented by the above formulae (1) to (3) include γ-methacryloyloxypropyltrimethoxysilane, γ-methacryloyloxypropyltriethoxysilane, γ-methacryloyloxypropylmethyldimethoxysilane, (3-acryloyloxypropyl)dimethylmethoxysilane, (3-acryloyloxypropyl)methyldimethoxysilane, (3-acryloyloxypropyl)trimethoxysilane, 3-(N-allylamino)propyltrimethoxysilane, allyldimethoxysilane, allyltriethoxysilane, allyltrimethoxysilane, 3-aminophenoxydimethylvinylsilane, 4-aminophenoxydimethylvinylsilane, 3-(3-aminopropoxy)-3,3-dimethyl-1-propenyltrimethoxysilane, butenyltriethoxysilane, 2-(chloromethyl)allyltrimethoxysilane, diethoxyvinylsilane, 1,3-divinyltetraethoxydisiloxane, docosenyltriethoxysilane, O-(methacryloyloxyethyl)-N-(triethoxysilylpropyl) urethane, N-(3-methacryloyloxy-2-hydroxypropyl)-3-aminopropyltriethoxysilane, methacryloyloxyethoxytrimethylsilane, (methacryloyloxymethyl)dimethylethoxysilane, methacryloyloxymethyltriethoxysilane, methacryloyloxymethyltrimethoxysilane, methacryloyloxypropyldimethylethoxysilane, methacryloyloxypropyldimethylmethoxysilane, methacryloyloxypropyltris(methoxyethoxy)silane, 7-octenyltrimethoxysilane, 1,3-bis(methacryloyloxy)-2-trimethylsiloxypropane, tetrakis(2-methacryloyloxyethoxy)silane, trivinylethoxysilane, trivinylmethoxysilane, vinyldimethylethoxysilane, vinyldiphenylethoxysilane, vinylmethyldiacetoxysilane, vinylmethyldiethoxysilane, vinylmethyldimethoxysilane, O-(vinyloxyethyl)-N-(triethoxysilylpropyl)urethane, vinyloxytrimethylsilane, vinylphenyldiethoxysilane, vinylphenylmethylmethoxysilane, vinyltriacetoxysilane, vinyl tri-t-butoxysilane, vinyltriethoxysilane, vinyltriisopropenoxysilane, vinyltriisopropoxysilane, vinyltrimethoxysilane vinyltriphenoxysilane, and vinyl tris(2-methoxyethoxy) silane. These silyl monomers can be used alone or in admixture of two or more.

Of these, γ-methacryloyloxypropyltrimethoxysilane, γ-methacryloyloxypropyltriethoxysilane, γ-methacryloyloxypropylmethyldimethoxysilane, (3-acryloyloxypropyl)dimethylmethoxysilane, (3-acryloyloxypropyl)methyldimethoxysilane, (3-acryloyloxypropyl)trimethoxysilane, (methacryloyloxymethyl)dimethylethoxysilane, methacryloyloxymethyltriethoxysilane, methacryloyloxymethyltrimethoxysilane, methacryloyloxypropyldimethylethoxysilane and methacryloyloxypropyldimethylmethoxysilane which are silyl monomers represented by the above formula (4) can be particularly suitably used.

(b) Isocyanate Monomer:

In the present invention, an isocyanate monomer can be used as the component (A1) in the first coating composition in place of the above silyl monomer or together with the silyl monomer so as to improve adhesion to a substrate and to a hard coat layer. As the isocyanate monomer, any known compounds having an isocyanate group (—NCO) and a radical polymerizable group can be used without any restrictions. Illustrative examples of such isocyanate monomers include those represented by the following formulae (5) and (6):

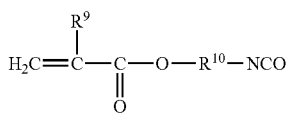
(5)

wherein $R^9$ is a hydrogen atom or a methyl group, and $R^{10}$ is an alkylene group,

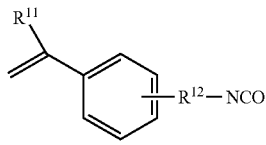
(6)

wherein $R^{11}$ is a hydrogen atom or a methyl group, and $R^{12}$ is an alkylene group.

In the above formulae (5) and (6), $R^{10}$ and $R^{12}$ represent an alkylene group. As the alkylene group, an alkylene group having 1 to 10 carbon atoms is preferred. Specific examples thereof include methylene, ethylene, propylene, trimethylene and butylene groups.

Specific examples of isocyanate monomers which can be suitably used include 2-isocyanate ethoxy methacrylate and 4-(2-isocyanateisopropyl)styrene. These isocyanate monomers can be used alone or in admixture of two or more.

2. Component (B1): Description of Ester-Linkage-Containing Monomer

As the ester-linkage-containing monomer which is the component (B1) of the first coating composition, any known radical polymerizable monomers (excluding those containing only oxycarbonyl groups derived from an acryloyloxy group and a methacryloyloxy group as oxycarbonyl groups) having at least one oxycarbonyl group {—O—C(=O) group or —C(=O)—O— group} in a molecule can be used without any restrictions.

Illustrative examples of the ester-linkage-containing monomer include compounds represented by the following formulae (7), (8), (10) and (12):

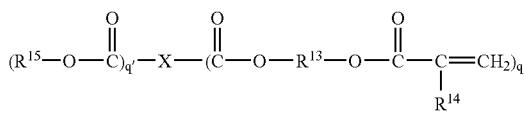
(7)

wherein $R^{13}$ is an alkylene group having 1 to 10 carbon atoms which may have a substituent, $R^{14}$ is a hydrogen atom or a methyl group, $R^{15}$ is hydrogen or an alkyl group having 1 to 10 carbon atoms which may have a substituent, X is a divalent organic residue, q is 1 or 2, and q' is 0 or 1, provided that q+q'=2,

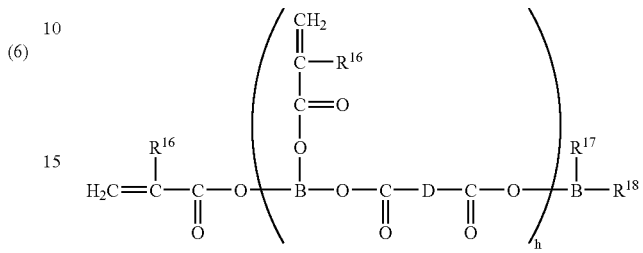
(8)

wherein h is an integer of 0 to 10, $R^{16}$ is a hydrogen atom or a methyl group, $R^{17}$ and $R^{18}$ are each independently a (meth)acryloyloxy group or a group represented by the following formula (9):

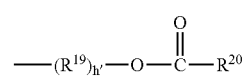
(9)

wherein $R^{19}$ is an alkylene group having 1 to 10 carbon atoms, $R^{20}$ is an alkyl group having 1 to 10 carbon atoms, and h' is an integer of 0 or 1, B is a trivalent organic residue, and D is a divalent organic residue, provided that when h is 0, either of $R^{17}$ and $R^{18}$ is a group represented by the above formula (9),

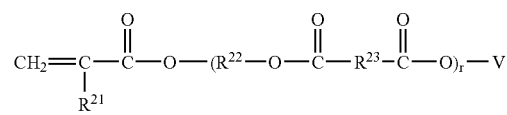
(10)

wherein $R^{21}$ is a hydrogen atom or a methyl group, $R^{22}$ and $R^{23}$ are each independently an alkylene group having 1 to 10 carbon atoms, V is a hydrogen atom or a group represented by the following formula (11):

(11)

wherein $R^{24}$ is an alkylene group having 1 to 10 carbon atoms, and U is an alkyl group having 1 to 10 carbon atoms, a hydrogen atom, a benzene ring or a (meth)acryloyloxy group, and r is an integer of 1 to 10,

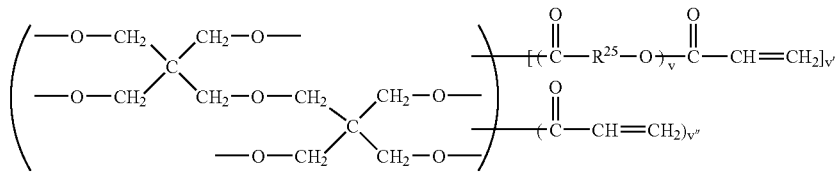
(12)

wherein $R^{25}$ is an alkylene group having 1 to 10 carbon atoms, v is an integer of 1 to 5, v' is an integer of 1 to 6, v" is an integer of 0 to 5, and v'+v"=6.

Further, the above formula implies that either one of two monovalent groups shown outside the parentheses is bonded to the six unbonded sites of the hexavalent group shown in the parentheses.

$R^{13}$ in the above formula (7) is an alkylene group having 1 to 10 carbon atoms which may have a substituent, and $R^{14}$ represents a hydrogen atom or a methyl group. Illustrative examples of the alkylene group having 1 to 10 carbon atoms as $R^{13}$ include methylene, ethylene, propylene, trimethylene and butylene groups. Further, when the alkylene group has a substituent, illustrative examples of the substituent include halogen atoms such as fluorine, chlorine and bromine atoms; a hydroxyl group; an amino group; a mercapto group; a cyano group; and a nitro group.

$R^{15}$ in the above formula (7) is a hydrogen atom or an alkyl group having 1 to 10 carbon atoms which may have a substituent. Illustrative examples of the alkyl group which may have a substituent include a methyl group, an ethyl group, a propyl group, a butyl group, and substituted alkyl groups obtained by substituting at least one hydrogen atom of the above alkyl groups with at least one substituent selected from the group consisting of halogen atoms such as fluorine, chlorine and bromine atoms; a hydroxyl group; an amino group; a mercapto group; a cyano group; and a nitro group.

X in the above formula (7) is a divalent organic residue, and preferred examples thereof include divalent organic residues having ring structures, e.g., an aromatic ring such as a benzene ring, a saturated hydrocarbon ring such as a cyclohexyl ring and an unsaturated hydrocarbon ring such as a cyclohexene ring. Of these, from the viewpoint of easy availability of a raw material, a phenylene group, a cyclohexylene group and a cyclohexelene group are more preferred as X.

$R^{16}$ in the above formula (8) is a hydrogen atom or a methyl group, and $R^{17}$ and $R^{18}$ are a (meth)acryloyloxy group or a group represented by the above formula (9). $R^{19}$ in the above formula (9) is an alkylene group having 1 to 10 carbon atoms, and $R^{20}$ is an alkyl group having 1 to 10 carbon atoms. Illustrative examples of the alkylene group as $R^{19}$ include methylene, ethylene, propylene, trimethylene and butylene groups. Illustrative examples of the alkyl group as $R^{20}$ include methyl, ethyl, propyl and butyl groups.

Further, B in the above formula (8) is a trivalent organic residue, and D is a divalent organic residue. B and D are not particularly limited and may contain a linkage other than a carbon-carbon linkage such as an ester linkage, an ether linkage, an amide linkage, a thioether linkage, a sulfonyl linkage and an urethane linkage in the principal chain. Preferably, B is an organic residue derived from a linear or branched hydrocarbon having 3 to 10 carbon atoms or an organic residue derived from an aromatic hydrocarbon having 6 to 10 carbon atoms, and D is preferably an organic residue derived from a linear or branched aliphatic hydrocarbon having 1 to 10 carbon atoms or an aromatic hydrocarbon having 6 to 10 carbon atoms. Suitable examples of B include trivalent groups derived from a benzene ring and a pyridine ring. Suitable examples of D include ethylene, propylene, trimethylene, butylene and phenylene groups.

$R^{21}$ in the above formula (10) is a hydrogen atom or a methyl group, and $R^{22}$ and $R^{23}$ represent an alkylene group having 1 to 10 carbon atoms. The alkylene group may be linear or branched, and specific examples thereof include methylene, ethylene, propylene, trimethylene, butylene and pentylene groups.

V in the above formula (10) is a hydrogen atom or a group represented by the above formula (11). $R^{24}$ in the above formula (11) is an alkylene group having 1 to 10 carbon atoms. The alkylene group may be linear or branched. Specific examples thereof include methylene, ethylene, propylene, trimethylene, butylene and pentylene groups. Further, U in the above formula (11) is an alkyl group having 1 to 10 carbon atoms, a hydrogen atom, a benzene ring or a (meth) acryloyloxy group.

$R^{25}$ in the above formula (12) is an alkylene group having 1 to 10 carbon atoms. The alkylene group may be linear or branched, and specific examples thereof include methylene, ethylene, propylene, trimethylene, butylene and pentylene groups.

Specific examples of the ester-linkage-containing monomers represented by the above formulae (7), (8), (10) and (12) include 2-acryloyloxyethyl hydrogen phthalate, 2-acryloyloxypropyl hydrogen phthalate, 2-acryloyloxypropylhexahydro hydrogen phthalate, 2-acryloyloxypropyltetrahydro hydrogen phthalate, 2-acryloyloxyethyl-2-hydroxyethyl phthalate, 2-acryloyloxyethylhexahydro phthalate, 2-acryloyloxyethyl phthalate, bis(2-acryloyloxyhydroxypropyl)phthalate, bis(2-acryloyloxyhydroxypropyltetrahydrohydrogen) phthalate, 2-methacryloyloxyethylhexahydro phthalate, 2-methacryloyloxyethyl-2-hydroxypropyl phthalate, bis(2-methacryloyloxyethyl)phthalate, 2-methacryloyloxyethylsuccinic acid, 2-acryloyloxyethylsuccinic acid, 2-methacryloyloxyethylmaleic acid, 2-acryloyloxyethylmaleic acid, a tetrafunctional polyester oligomer having a molecular weight of 2,500 to 3,500 (such as EB80 of DAICEL UCB CO., LTD.), a tetrafunctional polyester oligomer having a molecular weight of 6,000 to 8,000 (such as EB450 of DAICEL UCB CO., LTD.), a hexafunctional polyester oligomer having a molecular weight of 45,000 to 55,000 (such as EB1830 of DAICEL UCB CO., LTD.), a tetrafunctional polyester oligomer having a molecular weight of 10,000 (such as GX8488B of Dai-ichi Kogyo Seiyaku Co., Ltd.), neopentyl glycol acrylic acid benzoate, hydroxypivalic acid neopentyl glycol diacrylate, β-methacryloyloxyethyl hydrogen succinate, a difunctional polyester acrylate oligomer having a molecular weight of 250 to 3,000 (such as PHOTOMER 5007 and PHOTOMER 5018 of SAN NOPCO LIMITED; M-6100 and M-6500 of TOAGOSEI CO., LTD.), a polyester acrylate which has three or more functional groups and a molecular weight of 300 to 2,000 (such as M-7100 and M-8530 of TOAGOSEI CO., LTD.), an acrylated acryl copolymer having a molecular weight of 9,000 to 17,000 (such as EB1701 of DAICEL UCB CO., LTD.), pentaerythritol diacrylate monostearate having a molecular weight of 300 to 500 (such as M-233 of TOAGOSEI CO., LTD.), ω-carboxy-polycaprolactone monoacrylate having a molecular weight of 180 to 1,500 (such as FA3 and FA5 of DAICEL CHEMICAL INDUSTRIES, LTD.), a hexafunctional polycaprolactone acrylate having a molecular weight of 900 to 3,000 (such as KAYARAD DPCA-20 and DPCA-60 of Nippon Kayaku Co., Ltd.), ω-carboxy-polycaprolactone monomethacrylate having a molecular weight of 200 to 1,500 (such as FM3 and FM5 of DAICEL CHEMICAL INDUSTRIES, LTD.), BEAMSET 101 of Arakawa Chemical Industries, Ltd., unsaturated polyesters UNIDIC V-3265, V-3270 and V-3121 of DAINIPPON INK AND CHEMICALS, INC., $SR^{9008}$ and $SR^{9012}$ of THERTOMER CO., LTD., and RA1050 and RA2003 of Mitsui Chemicals, Inc. In addition to the above examples, the ester-linkage-containing monomers include KAYAMER PM-2 and PM-21 of Nippon Kayaku Co., Ltd.

3. Description of Component (C1)

In addition to the above silyl monomer and/or isocyanate monomer and ester-linkage-containing monomer, the composition of the present invention also contains a radical polymerizable monomer (hereinafter referred to as "other monomer") other than these monomers as the component (C1) in an amount of 30 to 99.8 wt % from the viewpoints of solvent resistance after curing, cured product properties such as hardness and heat resistance and photochromic properties such as a developed color density, a color fading rate and durability.

Although such a monomer component (C1) is not particularly limited, a compound having a (meth)acryloyl group or a (meth)acryloyloxy group as a radical polymerizable group is preferred from the viewpoints of easy availability and good curing properties. Further, from the viewpoints of solvent resistance after curing, cured product properties such as hardness and heat resistance and photochromic properties such as a developed color density and a color fading rate, a combination of a monomer (hereinafter referred to as "high hardness monomer") showing an L scale Rockwell hardness of 60 or higher when homopolymerized and a monomer (hereinafter referred to as "low hardness monomer") showing an L scale Rockwell hardness of 40 or lower when homopolymerized is more preferably used as the monomer component (C1). In this case, it is also possible to use a radical polymerizable monomer (hereinafter referred to as "medium hardness monomer") showing an L scale Rockwell hardness of higher than 40 and lower than 60 when homopolymerized in combination with the high hardness monomer and the low hardness monomer.

The above high hardness monomer, low hardness monomer and medium hardness monomer can be mixed together and used as appropriate. To balance the solvent resistance after curing, cured product properties such as hardness and heat resistance and photochromic properties such as a developed color density and a color fading rate of the curable composition, the amount of the low hardness monomer in the monomer component (C1) is preferably 5 to 70 wt %, and the amount of the high hardness monomer is preferably 5 to 95 wt %. Further, it is particularly preferred that as the high hardness monomer to be contained, a monomer having three or more radical polymerizable groups be contained in other radical polymerizable monomers in an amount of at least 5 wt %. As for suitable composition of the above monomer component (C1), the low hardness monomer, the medium hardness monomer and the high hardness monomer add up to 100 wt %.

The L scale Rockwell hardness is hardness measured in accordance with JIS-B7726, and by measuring the hardness for the homopolymer of each monomer, it can be easily determined whether the monomer satisfies the above hardness conditions. To be more specific, it can be easily checked by polymerizing the monomer so as to obtain a cured product having a thickness of 2 mm, keeping the cured product in a room of 25° C. for 1 day and then measuring the L scale Rockwell hardness of the cured product by use of a Rockwell hardness meter as shown in Examples to be described later. Further, a polymer to be subjected to the above measurement of the L scale Rockwell hardness is a polymer obtained by cast polymerizing a charged monomer under conditions where 90% or more of the monomer is polymerized. The L scale Rockwell hardness of a cured product resulting from polymerization under such conditions is measured as a nearly constant value.

Further, separately from classification by hardness as described above, a radical polymerizable monomer (hereinafter also referred to as "epoxy monomer") having at least one epoxy group and at least one radical polymerizable group in a molecule is preferably contained in the monomer component (C1). Since an L scale Rockwell hardness of a polymer affected by the structure of a monomer, the epoxy monomer include a monomer whose homopolymer's L scale Rockwell hardness being 60 or higher and a monomer whose homopolymer's L scale Rockwell hardness being 40 or lower. That is, the epoxy monomer includes a monomer which classified into a high hardness monomer, a low hardness monomer or a medium hardness monomer.

Hereinafter, these monomer components (C1) will be further described.

(a) High Hardness Monomer

A high hardness monomer has an effect of improving the solvent resistance, hardness and heat resistance of a cured product. As a high hardness monomer which exhibits the effect more effectively, a radical polymerizable monomer showing an L scale Rockwell hardness of 65 to 130 when homopolymerized is preferred.

The high hardness monomer is a compound which preferably has 2 to 15 radical polymerizable groups, more preferably 2 to 6 radical polymerizable groups. Illustrative examples thereof include compounds represented by the following formulae (13) to (16):

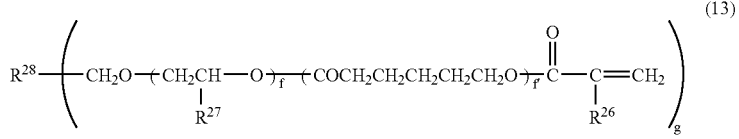

wherein $R^{26}$ is a hydrogen atom or a methyl group, $R^{27}$ is a hydrogen atom, a methyl group or an ethyl group, $R^{28}$ is a tri- to hexa-valent organic residue, f is an integer of 0 to 3, f' is an integer of 0 to 3, and g is an integer of 3 to 6,

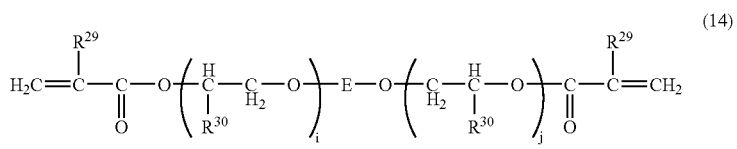

wherein $R^{29}$ is a hydrogen atom or a methyl group, $R^{30}$ is a hydrogen atom, a methyl group, an ethyl group or a hydroxyl group, E is a divalent organic residue containing a cyclic group, and i and j are a positive integer or 0 so that the average of i+j is 0 to 6,

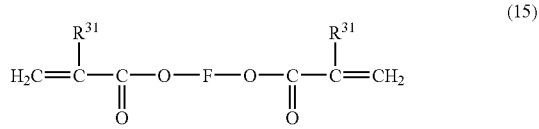

(15)

wherein $R^{31}$ is a hydrogen atom or a methyl group, and F is an alkylene group which has 2 to 9 carbon atoms in the principal chain and may have a side chain,

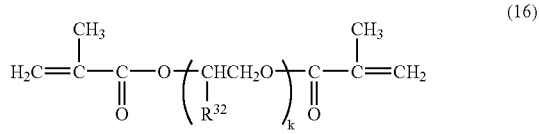

(16)

wherein $R^{32}$ is a hydrogen atom, a methyl group or an ethyl group, and k is an integer of 1 to 6.

$R^{26}$, $R^{29}$ and $R^{31}$ in the above formulae (13) to (16) are a hydrogen atom or a methyl group. That is, the compounds represented by the formulae (13) to (15) have 2 to 6 (meth)acryloyloxy groups.

$R^{27}$ in the above formulae (13) is a hydrogen atom, a methyl group or an ethyl group. Further, $R^{28}$ is a tri- to hexa-valent organic residue. The organic residue is not particularly limited and may contain a linkage other than a carbon-carbon linkage such as an ether linkage, an amide linkage, a thioether linkage, a sulfonyl linkage and an urethane linkage in the principal chain. In order for the compound to show an L scale Rockwell hardness of 60 or higher when homopolymerized, $R^{28}$ is preferably an organic residue having 1 to 30 carbon atoms, more preferably an organic residue which has 1 to 15 carbon atoms and may have an ether linkage and/or an urethane linkage. Further, f and f' are each independently an integer of 0 to 3. When these f and f' are larger than 3, the L scale Rockwell hardness of the monomer when homopolymerized is liable to be lower than 60. Further, in order for the compound to show an L scale Rockwell hardness of 60 or higher, the total of f and f' is preferably 0 to 3.

Specific examples of the high hardness monomer represented by the above formula (13) include trimethylolpropane trimethacrylate, trimethylolpropane triacrylate, tetramethylolmethane trimethacrylate, tetramethylolmethane triacrylate, trimethylolpropane trimethacrylate, tetramethylolmethane tetramethacrylate, tetramethylolmethane tetraacrylate, trimethylolpropane triethylene glycol trimethacrylate, trimethylolpropane triethylene glycol triacrylate, ethoxylated pentaerythritol tetraacrylate, ethoxylated pentaerythritol tetramethacrylate, pentaerythritol trimethacrylate, pentaerythritol tetramethacrylate, dipentaerythritol hexaacrylate, urethane oligomer tetraacrylate, urethane oligomer hexamethacrylate, urethane oligomer hexaacrylate, and ditrimethylolpropane tetraacrylate.

$R^{30}$ in the above formula (14) is a hydrogen atom, a methyl group, an ethyl group or a hydroxyl group. Further, E is a divalent organic residue containing a cyclic group. As the organic residue, any organic residue containing a cyclic group can be used, and the organic residue may contain a linkage other than a carbon-carbon linkage such as an ether linkage, an amide linkage, a thioether linkage, a sulfonyl linkage and an urethane linkage in the principal chain. Illustrative examples of the cyclic group contained in E include phenylene, cyclohexylene and adamantylene groups and the following cyclic groups.

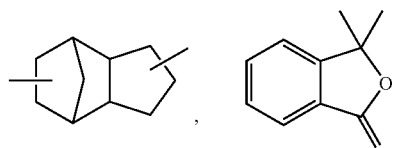

The cyclic group contained in E is preferably a phenylene group, particularly preferably a group represented by the following formula:

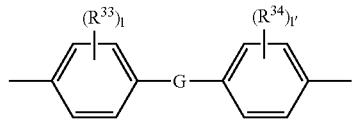

wherein G is an oxygen atom, a sulfur atom or a group selected from the group consisting of —S($O_2$)—, —C(O)—, —$CH_2$—, —CH=CH—, —C($CH_3$)$_2$— and —C($CH_3$)($C_6H_5$)—, $R^{33}$ and $R^{34}$ are each independently an alkyl group having 1 to 4 carbon atoms or a halogen atom, and l and l' are each independently an integer of 0 to 4.

E is most preferably a group represented by the following formula.

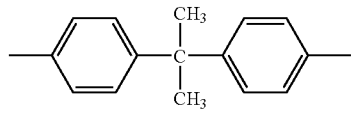

Further, in the formula (14), i and j are a positive integer or 0 so that the average of i+j is 0 to 6. Except for the case where both i and j are 0, the compound represented by the formula (14) is generally obtained as a mixture of compounds whose i and j are different, and it is difficult to isolate the compounds. Accordingly, i and j are represented by the average of i and j. The average of i and j is preferably 2 to 6.

Specific examples of the compound represented by the above formula (14) include bisphenol A dimethacrylate, 2,2-bis(4-methacryloyloxyethoxyphenyl)propane, and 2,2-bis(3,5-dibromo-4-methacryloyloxyethoxyphenyl) propane.

F in the above formula (15) is an alkylene group which has 2 to 9 carbon atoms in the principal chain and may have a side chain. Illustrative examples of the alkylene group which has 2 to 9 carbon atoms in the principal chain include ethylene, propylene, trimethylene, butylene, neopentylene, hexylene and nonylene groups. When the principal chain has more than 9 carbon atoms, L scale Rockwell hardness when the monomer is homopolymerized is liable to be lower than 60. Specific examples of the compound represented by the above formula (15) include ethylene glycol diacrylate, ethylene glycol dimethacrylate, 1,4-butylene glycol dimethacrylate, 1,9- nonylene glycol dimethacrylate, neopentylene glycol dimethacrylate, and neopentylene glycol diacrylate.

$R^{32}$ in the above formula (16) is a hydrogen atom, a methyl group or an ethyl group, and k is an integer of 2 to 6. When k is larger than 6, L scale Rockwell hardness when the monomer is homopolymerized is liable to be lower than 60. k is preferably 3 or 4. Specific examples of the compound represented by the formula (16) include diethylene glycol dimethacrylate, triethylene glycol dimethacrylate, tetraethylene glycol dimethacrylate, tripropylene glycol dimethacrylate, and tetrapropylene glycol dimethacrylate.

These radical polymerizable monomers showing an L scale Rockwell hardness of 60 or higher when homopolymerized may be used alone or in admixture of two or more.

Of the compounds represented by the above formulae (13) to (16), there are compounds showing an L scale Rockwell hardness of lower than 60 when homopolymerized, depending on a combination of substituents. In that case, these compounds are classified into low hardness monomers or medium hardness monomers.

Further, there are high hardness monomers which are not represented by the above formulae (13) to (16). Illustrative examples thereof include bisphenol A diglycidyl methacrylate, ethylene glycol bisglycidyl methacrylate, and glycidyl methacrylate.

(b) Low Hardness Monomer

The curable composition of the present invention preferably contains a low hardness monomer showing an L scale Rockwell hardness of 40 or lower when homopolymerized, in addition to the above high hardness monomer.

The low hardness monomer has effects of making a cured product strong and improving the color fading rate of the photochromic compound.

Illustrative examples of such a low hardness monomer include difunctional monomers represented by the following formulae (17) and (18) and monofunctional monomers represented by the following formulae (19) and (20):

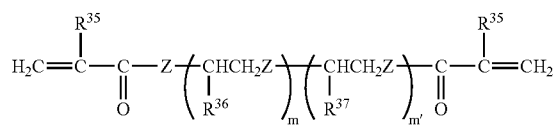

(17)

wherein $R^{35}$ is a hydrogen atom or a methyl group, $R^{36}$ and $R^{37}$ are each independently a hydrogen atom, a methyl group or an ethyl group, Z is an oxygen atom or a sulfur atom, m is an integer of 1 to 70, and m' is an integer of 0 to 70, provided that when $R^{35}$ is a hydrogen atom, m is an integer of 1 to 70, and when $R^{35}$ is a methyl group, m is an integer of 7 to 70,

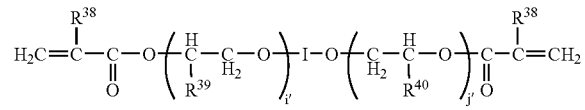

(18)

wherein $R^{38}$ is a hydrogen atom or a methyl group, $R^{39}$ and $R^{40}$ are each independently a hydrogen atom, a methyl group, an ethyl group or a hydroxyl group, I is a divalent organic residue containing a cyclic group, and i' and j' are such positive integers that the average of i'+j' is 8 to 40,

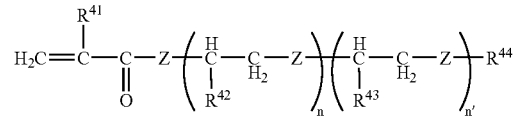

(19)

wherein $R^{41}$ is a hydrogen atom or a methyl group, $R^{42}$ and $R^{43}$ are each independently a hydrogen atom, a methyl group or an ethyl group, $R^{44}$ is a hydrogen atom, an alkyl, alkenyl, alkoxyalkyl or haloalkyl group having 1 to 25 carbon atoms, an aryl group having 6 to 25 carbon atoms or an acyl group having 2 to 25 carbon atoms other than a (meth)acryloyl group, Z is an oxygen atom or sulfur atom, n is an integer of 1 to 70, and n' is an integer of 0 to 70, provided that when $R^{41}$ is a hydrogen atom, n is an integer of 1 to 70, and when $R^{41}$ is a methyl group, n is an integer of 4 to 70,

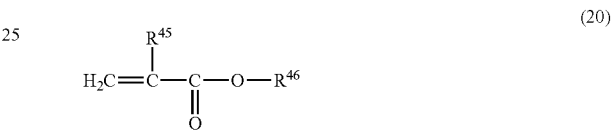

(20)

wherein $R^{45}$ is a hydrogen atom or a methyl group, and $R^{46}$ is an alkyl group having 1 to 40 carbon atoms, provided that when $R^{45}$ is a hydrogen atom, $R^{46}$ is an alkyl group having 1 to 20 carbon atoms, and when $R^{45}$ is a methyl group, $R^{46}$ is an alkyl group having 8 to 40 carbon atoms.

In the above formulae (17) to (20), $R^{35}$, $R^{38}$, $R^{41}$ and $R^{45}$ are a hydrogen atom or a methyl group. In other words, the low hardness monomers generally have up to two (meth)acryloyloxy groups or (meth)acryloylthio groups as a polymerizable group.

$R^{36}$ and $R^{37}$ in the above formula (17) are each independently a hydrogen atom, a methyl group or an ethyl group, and Z is an oxygen atom or a sulfur atom. Further, when $R^{35}$ is a hydrogen atom, i.e., when the monomer has an acryloyloxy group or an acryloylthio group as a polymerizable group, m is an integer of 7 to 70, while when $R^{35}$ is a methyl group, i.e., when the monomer has a methacryloyloxy group or a methacryloylthio group as a polymerizable group, m is an integer of 1 to 70. Further, m' is an integer of 0 to 70. Specific examples of the low hardness monomer represented by the formula (17) include alkylene glycol di(meth)acrylates such as trialkylene glycol diacrylate, tetraalkylene glycol diacrylate, nonylalkylene glycol diacrylate and nonylalkylene glycol dimethacrylate.

$R^{39}$ and $R^{40}$ in the above formula (18) are each independently a hydrogen atom, a methyl group or an ethyl group. Further, I is a divalent organic residue containing a cyclic group. Examples of I are the same as those presented as examples of E which is a cyclic-group in the above general formula (14). i' and j' in the formula (18) are such integers that the average of i'+j' is 8 to 40, preferably 9 to 30. Due to the same reason as that for i and j in the above formula (14), i' and j' are generally represented as the average of i'+j'. Specific examples of the low hardness monomer represented by the formula (18) include 2,2-bis(4-acryloyloxypolyethyleneglycolphenyl)propane having an average molecular weight of 776.

$R^{42}$ and $R^{43}$ in the above formula (19) are each independently a hydrogen atom, a methyl group or an ethyl group. $R^{44}$ is a hydrogen atom, an alkyl, alkenyl, alkoxyalkyl or haloalkyl group having 1 to 25 carbon atoms, an aryl group having 6 to 25 carbon atoms or an acyl group having 2 to 25 carbon atoms other than an acryloyl group. Illustrative examples of the alkyl and alkenyl groups having 1 to 25 carbon atoms include methyl, ethyl, propyl and nonyl groups. Further, these alkyl and alkenyl groups may be linear or branched and may be substituted with a substituent such as a halogen atom, a hydroxyl group, an aryl group or an epoxy group. Illustrative examples of the alkoxyalkyl group having 1 to 25 carbon atoms include methoxybutyl, ethoxybutyl, butoxybutyl and methoxynonyl groups. Illustrative examples of the aryl group having 6 to 25 carbon atoms include phenyl, toluyl, anthranyl and octylphenyl groups. Illustrative examples of the acyl group other than a (meth)acryloyl group include acetyl, propionyl, butyryl, valeryl and oleyl groups. When $R^{41}$ is a hydrogen atom, i.e., when the monomer has an acryloyloxy group or an acryloylthio group as a polymerizable group, n in the formula (19) is an integer of 1 to 70, while when $R^{41}$ is a methyl group, i.e., when the monomer has a methacryloyloxy group or a methacryloylthio group as a polymerizable group, n is an integer of 4 to 70, and n' is an integer of 0 to 70.

Specific examples of the low hardness monomer represented by the formula (19) include polyalkylene glycol (meth)acrylates such as a polyethylene glycol methacrylate having an average molecular weight of 526, a polyethylene glycol methacrylate having an average molecular weight of 360, a methyl ether polyethylene glycol methacrylate having an average molecular weight of 475, a methyl ether polyethylene glycol methacrylate having an average molecular weight of 1,000, a polypropylene glycol methacrylate having an average molecular weight of 375, a polypropylene methacrylate having an average molecular weight of 430, a polypropylene methacrylate having an average molecular weight of 622, a methyl ether polypropylene glycol methacrylate having an average molecular weight of 620, a polytetramethylene glycol methacrylate having an average molecular weight of 566, an octylphenyl ether polyethylene glycol methacrylate having an average molecular weight of 2,034, a nonyl ether polyethylene glycol methacrylate having an average molecular weight of 610, a methyl ether polyethylene thioglycol methacrylate having an average molecular weight of 640, and perfluoroheptyl ethylene glycol methacrylate having an average molecular weight of 498.

$R^{45}$ in the above formula (20) is a hydrogen atom or a methyl group. When $R^{45}$ is a hydrogen atom, $R^{46}$ is an alkyl group having 1 to 20 carbon atoms, while when $R^{45}$ is a methyl group, $R^{46}$ is an alkyl group having 8 to 40 carbon atoms. These alkyl groups may be linear or branched and may be substituted with a substituent such as a halogen atom, a hydroxyl group, an alkoxyl group, an acyl group or an epoxy group. Specific examples of the low hardness monomer represented by the formula (20) include stearyl methacrylate, lauryl methacrylate, ethylhexyl methacrylate, methyl acrylate, ethyl acrylate, butyl acrylate and lauryl acrylate.

Of the low hardness monomers represented by these formulae (17) to (20), the methyl ether polyethylene glycol methacrylate having an average molecular weight of 475, the methyl ether polyethylene glycol methacrylate having an average molecular weight of 1,000, trialkylene glycol diacrylate, tetraalkylene glycol diacrylate, nonylalkylene glycol diacrylate, methyl acrylate, ethyl acrylate, butyl acrylate and lauryl acrylate are particularly preferred.

These radical polymerizable monomers showing an L scale Rockwell hardness of 40 or lower when homopolymerized may be used alone or in admixture of two or more.

Of the compounds represented by the above formulae (17) to (20), there are compounds showing an L scale Rockwell hardness of higher than 40 when homopolymerized, depending on a combination of substituents. In that case, these compounds are classified into the above high hardness monomers or medium hardness monomers.

(c) Medium Hardness Monomer

The other monomer may also contain a monomer which is neither the above high hardness monomer nor the above low hardness monomer, i.e., a monomer (medium hardness monomer) whose homopolymer's L scale Rockwell hardness being higher than 40 and lower than 60. Illustrative examples of such a medium hardness monomer include radical polymerizable monofunctional monomers such as difunctional (meth)acrylates, e.g., a polytetramethylene glycol dimethacrylate having an average molecular weight of 650, a polytetramethylene glycol dimethacrylate having an average molecular weight of 1,400 and bis(2-methacryloyloxyethylthioethyl)sulfide; polyvalent allyl compounds, e.g., allyl diglycol carbonate; polyvalent thioacrylic ester compounds and polyvalent thiomethacrylic ester compounds, e.g., 1,2-bis(methacryloylthio)ethane, bis(2-acryloylthioethyl)ether and 1,4-bis(methacryloylthiomethyl)benzene; unsaturated carboxylic acids, e.g., acrylic acid, methacrylic acid and maleic anhydride; acrylic ester compounds and methacrylic ester compounds, e.g., methyl methacrylate, butyl methacrylate, benzyl methacrylate, phenyl methacrylate, 2-hydroxyethyl methacrylate and biphenyl methacrylate; fumaric ester compounds, e.g., diethyl fumarate and diphenyl fumarate; thioacrylic ester compounds and thiomethacrylic ester compounds, e.g., methyl thioacrylate, benzyl thioacrylate and benzyl thiomethacrylate; vinyl compounds, e.g., styrene, chlorostyrene, methylstyrene, vinylnaphthalene, α-methylstyrene dimer, bromostyrene, divinylbenzene and vinylpyrrolidone; and (meth)acrylates having 6 to 25 carbon atoms in the hydrocarbon chain and having an unsaturated bond in a molecule, e.g., oleyl methacrylate, nerol methacrylate, geraniol methacrylate, linalool methacrylate and farnesol methacrylate.

(d) Epoxy Monomer

An epoxy monomer is preferably contained in the monomer component (C1) so as to further improve adhesion between a coating layer and a substrate and to improve the durability of a photochromic compound when the photochromic compound is contained in the coating layer. As such an epoxy monomer, a compound having a (meth)acryloyloxy group as a radical polymerizable group is preferred.

The epoxy monomer is preferably represented by the following formula (21):

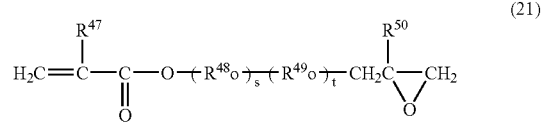

(21)

wherein $R^{47}$ and $R^{50}$ are each independently a hydrogen atom or a methyl group, $R^{48}$ and $R^{49}$ are each independently an alkylene group having 1 to 4 carbon atoms or a group represented by the following formula:

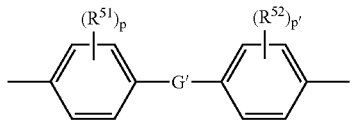

wherein G' is an oxygen atom, a sulfur atom or a group selected from the group consisting of —S(O$_2$)—, —C(O)—, —CH$_2$—, —CH=CH—, —C(CH$_3$)$_2$— and —C(CH$_3$)(C$_6$H$_5$)—, R$^{51}$ and R$^{52}$ are each independently an alkyl group having 1 to 4 carbon atoms or a halogen atom, and p and p' are each independently an integer of 0 to 4, and s and t are each an integer of 0 to 5.

Illustrative examples of the alkylene groups having 1 to 4 carbon atoms represented by R$^{48}$ and R$^{49}$ include methylene, ethylene, propylene, trimethylene and butylene groups. Further, these alkylene groups may be substituted with a hydroxyl group, a halogen atom or the like.

Further, as a group represented by the following formula as R$^{48}$ and/or R$^{49}$,

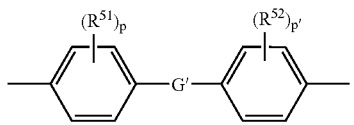

a group represented by the following formula is the most preferable.

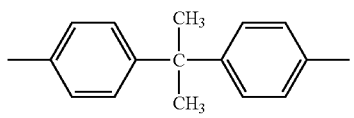

Specific examples of the epoxy monomer represented by the above formula (21) include glycidyl acrylate, glycidyl methacrylate, β-methylglycidyl methacrylate, bisphenol A-monoglycidyl ether-methacrylate, 4-glycidyloxy methacrylate, 3-(glycidyl-2-oxyethoxy)-2-hydroxypropyl methacrylate, 3-(glycidyloxy-1-isopropyloxy)-2-hydroxypropyl acrylate, 3-glycidyloxy-2-hydroxypropyloxy)-2-hydroxypropyl acrylate, and a glycidyloxy polyethylene glycol methacrylate having an average molecular weight of 540. Of these, glycidyl acrylate, glycidyl methacrylate and the glycidyloxy polyethylene glycol methacrylate having an average molecular weight of 540 are particularly preferred.

These epoxy monomers are suitably contained in the monomer component (C1) in an amount of 0.01 to 30 wt %, particularly suitably 0.1 to 20 wt %.

4. Component (A2): Description of Maleimide Compound

As the maleimide compound (the maleimide compound is also a monomer showing radical polymerizability) which is the component (A2) of the second coating composition of the present invention, any known compounds which are maleimide or derivatives thereof can be used without any restrictions.

Preferred examples of such compounds include compounds represented by the following formulae (1') to (3'):

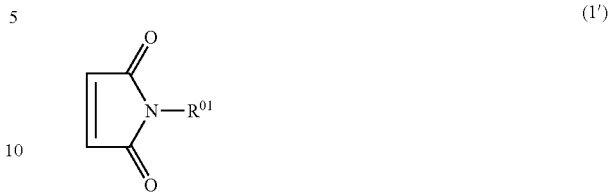

wherein R$^{01}$ is a substituted or unsubstituted alkyl group, a substituted or unsubstituted aryl group or a substituted or unsubstituted cycloalkyl group,

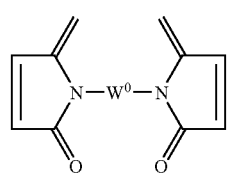

wherein W$^0$ is a divalent organic residue,

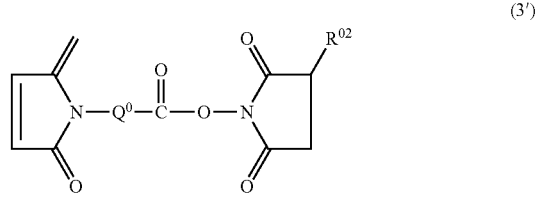

wherein Q$^0$ is a divalent organic residue, and R$^{02}$ is a hydrogen atom or a sodium sulfonate group.

R$^{01}$ in the above formula (1') represents a substituted or unsubstituted alkyl group, a substituted or unsubstituted aryl group or a substituted or unsubstituted cycloalkyl group. From the viewpoint of easy availability, R$^{01}$ is preferably an alkyl group having 1 to 20 carbon atoms, particularly 1 to 15 carbon atoms, an aryl group having 6 to 10 carbon atoms constituting the ring or a cycloalkyl group having 3 to 10 carbon atoms constituting the ring. Further, the alkyl, aryl and cycloalkyl groups may have substituents. Illustrative examples of substituents for the aryl and cycloalkyl groups include alkyl groups having 1 to 10 carbon atoms such as methyl, ethyl, propyl, isopropyl and t-butyl groups; halogenated alkyl groups having 1 to 10 carbon atoms such as chloromethyl and trifluoromethyl groups; alkoxyl groups having 1 to 10 carbon atoms such as methoxy, ethoxy and butoxy groups; ester groups having 2 to 10 carbon atoms such as methylester and ethylester groups; acyl groups having 2 to 10 carbon atoms such as acetyl, propionyl, oleyl and benzoyl groups; an amino group and substituted amino groups having 1 to 10 carbon atoms such as methylamino, ethylamino, dimethylamino and diethylamino groups; halogen atoms such as fluorine, chlorine and bromine atoms; a hydroxyl group; a carboxyl group; a mercapto group; a cyano group; and a nitro group. Meanwhile, illustrative examples of substituents for the alkyl group are the same as the above substituents excluding the alkyl groups having 1 to 10 carbon atoms.

Illustrative examples of the alkyl group as $R^{01}$ include methyl, ethyl, propyl, isopropyl, butyl, t-butyl and lauryl groups. Illustrative examples of the substituted or unsubstituted aryl group having 6 to 10 carbon atoms constituting the ring include phenyl, toluyl and xylyl groups. Illustrative examples of the substituted or unsubstituted aryl group having 3 to 10 carbon atoms constituting the ring include cyclopropyl, cyclobutyl, cyclopentyl and cyclohexyl groups.

$W^0$ in the above formula (2') is a divalent organic residue, preferably a divalent organic residue having 1 to 50 carbon atoms. The structure of the organic residue is not particularly limited and may have a side chain or a substituent. Further, in the structure, the organic residue may contain a linkage other than a carbon-carbon linkage such as an ether linkage, an amide linkage, an amino linkage, an urethane linkage or a thioether linkage and may also contain an oxa group (ketone carbon). Illustrative examples of substituents which may be contained in the organic residue include halogen atoms such as fluorine, chlorine and bromine atoms; alkyl groups such as methyl and ethyl groups; a methoxy group, a hydroxyl group, an amino group and a mercapto group.

As the divalent organic residue represented by $W^0$, a divalent organic residue having 1 to 30 carbon atoms is more preferred. Specific examples thereof include alkylene groups having 1 to 15 carbon atoms such as methylene, ethylene, propylene, trimethylene and butylene groups; and the following groups with or without the above substituents are bonded thereto.

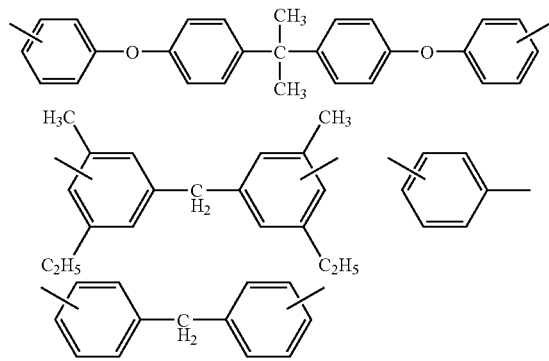

$Q^0$ in the above formula (3') is a divalent organic residue, preferably a divalent organic residue having 1 to 30 carbon atoms. The structure of the organic residue is not particularly limited and may have a side chain or a substituent. Further, in the structure, the organic residue may contain a linkage other than a carbon-carbon linkage such as an ether linkage, an amide linkage, an amino linkage, an urethane linkage or a thioether linkage and may also contain an oxa group (ketone carbon). Illustrative examples of substituents which may be contained in the organic residue include halogen atoms such as fluorine, chlorine and bromine atoms; alkyl groups such as methyl and ethyl groups; a methoxy group, a hydroxyl group, an amino group and a mercapto group.

As the organic residue represented by $Q^0$, an organic residue having 1 to 15 carbon atoms is more preferred. Specific examples thereof include alkylene groups having 1 to 15 carbon atoms such as methylene, ethylene, propylene, trimethylene and butylene groups; and the following groups with or without the above substituents are bonded thereto.

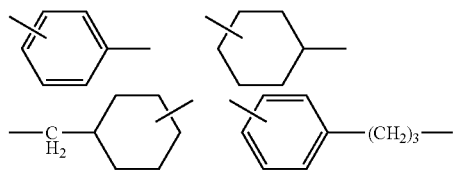

Further, $R^{02}$ in the above formula is a hydrogen atom or a sodium sulfonate group (i.e., "—$SO_3Na$" group).

Specific examples of maleimide compounds which can be suitably used out of the maleimide compounds represented by the above formulae (1') to (3') include N-phenyl maleimide, N-(2-chlorophenyl)maleimide, N-(4-chlorophenyl)maleimide, N-(2-bromophenyl)maleimide, N-(2,4,6-tribromophenyl)maleimide, N-(2-methylphenyl)maleimide, N-(3-methylphenyl)maleimide, N-(2,6-dimethylphenyl)maleimide, N-(4-ethylphenyl)maleimide, N-(2,6-diethylphenyl)maleimide, N-(4-hydroxyphenyl)maleimide, N-(4-carboxyphenyl)maleimide, N-(4-ethylesterphenyl)maleimide, N-(4-acethylphenyl)maleimide, N-(4-methoxyphenyl)maleimide, N-cyclohexyl maleimide, N-(2-chlorocyclohexyl)maleimide, N-(3-methylcyclohexyl)maleimide, N-methyl maleimide, N-propyl maleimide, N-isopropyl maleimide, N-butyl maleimide, N-(t-butyl)maleimide, N-octyl maleimide, N-lauryl maleimide, N,N'-(1,4-phenylene)bismaleimide, 4,4'-diphenylmethane bismaleimide, bis(3-ethyl-5-methyl-4-maleimidephenyl)methane, 2,2-bis[4-(4-maleimidephenoxy)phenyl]propane, m-maleimidebenzoyl-N-hydroxysuccinimideester, succinimidyl-4-(N-maleimidemethyl)cyclohexane-1-carboxylate, succinimidyl-4-(p-maleimidephenyl)butyrate, N-(4-maleimidebutyryloxy)sulfosuccinimide sodium salt, sulfosuccinimidyl-4-(N-maleimidemethyl)cyclohexane-1-carboxylate, and sulfosuccinimidyl-4-(p-maleimidephenyl)butyrate. These maleimide compounds can be used alone or in admixture of two or more.

5. Description of Component (B2)

The component (B2) of the second coating composition is not particularly limited as long as it is a radical polymerizable monomer which is different from the above component (A2). However, from the viewpoints of solvent resistance after curing, cured product properties such as hardness and heat resistance and photochromic properties such as a developed color density, a color fading rate and durability, the second coating composition suitably contains the same polymerizable monomer as the component (C1) in the first coating composition. In this case, the component (C1) suitably contains a high hardness monomer and a low hardness monomer, and a medium hardness monomer and an epoxy monomer as required, as in the case of the first coating composition. The proportions of these monomers in the component (C1) are also the same as those for the first coating composition. Further, for the purpose of further improving adhesion to a substrate, the component (B2) suitably contains at least one selected from the group consisting of the above component (A1) and the above component (B1). When the component (B2) contains the component (A1), good adhesion is attained between a coating film comprising a cured product of the second coating composition and a hard coat film formed on the coating film.

That is, the component (B2) is suitably any of the following (i) to (iv). "% by weight" of each component in the following (i) to (iv) is a value when the total weight of all polymerizable monomers in the second coating composition is 100%.

(i) (A1) 0.1 to 20 wt % of at least one radical polymerizable monomer selected from the group consisting of a radical polymerizable monomer having a silanol group or a group which produces a silanol group through hydrolysis and a radical polymerizable monomer having an isocyanate group, (B1) 0.1 to 50 wt % of radical polymerizable monomer (excluding one containing only an oxycarbonyl group derived from a (meth)acryloyloxy group as an oxycarbonyl group) other than the above component (A1) which has at least one oxycarbonyl group in a molecule, and (C1) 10 to 99.79 wt % of radical polymerizable monomer different from the above components (A1) and (B1).

(ii) 0.1 to 20 wt % of the above component (A1) and 60 to 99.89 wt % of the above component (C1).

(iii) 0.1 to 50 wt % of the above component (B1) and 30 to 99.89 wt % of the above component (C1).

(iv) 80 to 99.99 wt % of the above component (C1).

In the above aspects (i) and/or (ii), when the content of the component (A1) in all polymerizable monomer components is lower than 0.1 wt %, an effect of further improving adhesion is not seen, while when the content is higher than 20 wt %, a photochromic property such as a developed color density or a color fading rate deteriorates when a photochromic compound is contained. Further, when the content of the component (B1) in all polymerizable monomer components is lower than 0.1 wt %, the effect of further improving adhesion is not seen, while when the content is higher than 50 wt %, it is difficult to satisfy a photochromic property such as a developed color density or a color fading rate and all physical properties such as viscosity and adhesion of the composition when a photochromic compound is contained. From the viewpoint of the effect, the component (B2) suitably contains 0.5 to 20 wt % of the component (A1) and/or 0.5 to 40 wt % of the component (B1), particularly 1 to 10 wt % of the component (A1) and/or 1 to 30 wt % of the component (B2), based on the total weight of all polymerizable monomer components.

Description of Photochromic Compound

As the photochromic compound used in the present invention, any compound having a photochromic property can be used without any restrictions. As photochromic compounds, foulgimide compounds, spirooxazine compounds, chromene compounds and the like are well known. In the present invention, these photochromic compounds can be used without particular restrictions.

As the above foulgimide compound, spirooxazine compounds and chromene compounds, compounds described in JP-A 02-28154 (the term "JP-A" as used herein means an "unexamined published Japanese patent application"), JP-A 62-288830 and the specifications of WO94/22850 and WO96/14596 can be suitably used.

Further, as compounds having excellent photochromic properties, compounds disclosed in JP-A 2001-114775, JP-A 2001-031670, JP-A 2001-011067, JP-A 2001-011066, JP-A 2000-347346, JP-A 2000-344762, JP-A 2000-344761, JP-A 2000-327676, JP-A 2006-327675, JP-A 2000-256347, JP-A 2000-229976, JP-A 2000-229975, JP-A 2000-229974, JP-A 2000-229973, JP-A 2000-229972, JP-A 2000-219687, JP-A 2000-219686, JP-A 2000-219685, JP-A 11-322739, JP-A 11-286484, JP-A 11-279171, JP-A 10-298176, JP-A 09-218301, JP-A 09-124645, JP-A 08-295690, JP-A 08-176139 and JP-A 08-157467 can also be suitably used.

Of these photochromic compounds, chromene-based photochromic compounds have higher durability which is a photochromic property than other photochromic compounds, and in the compositions of the present invention, they improve a developed color density and a color fading rate which are photochromic properties more significantly than other photochromic compounds. Thus, the chromene-based photochromic compounds can be particularly suitably used. In addition, of these chromene-based photochromic compounds, since compounds having a molecular weight of 540 or higher improve photochromic properties such as a developed color density and a color fading rate particularly significantly in the compositions of the present invention, these compounds can be suitably used.

Specific examples of suitable compounds out of such chromene-based photochromic compounds include chromene compounds having the following structures.

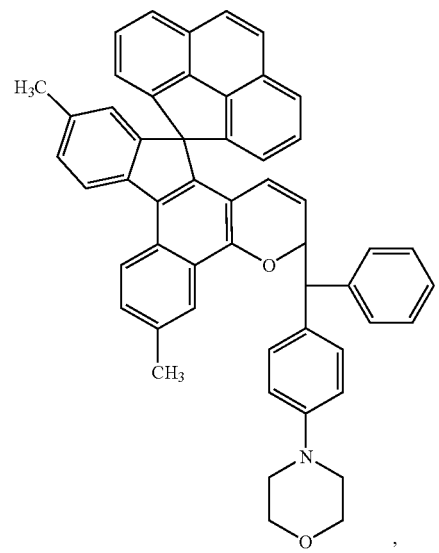

,

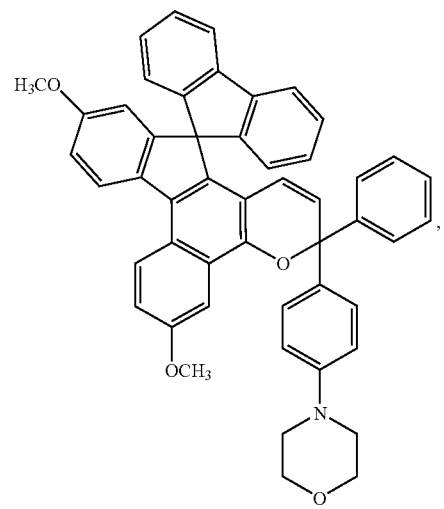

,

-continued

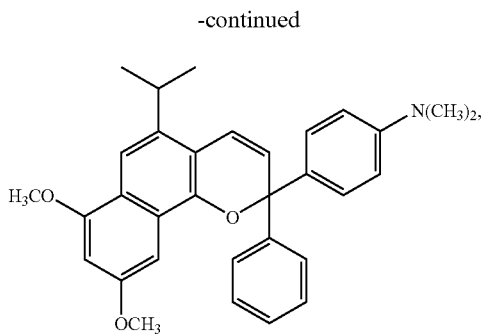

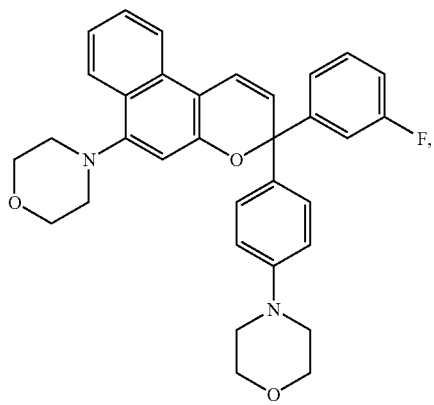

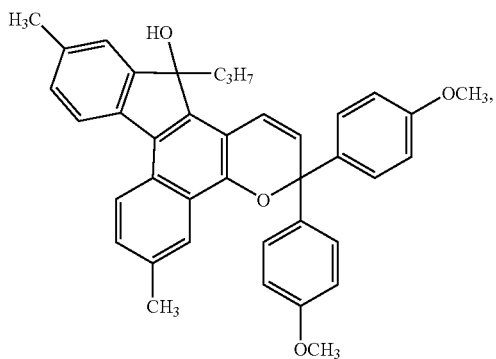

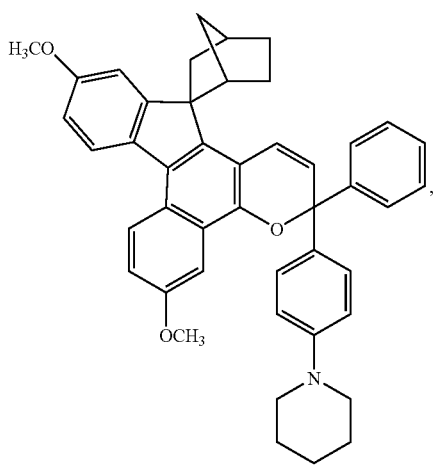

-continued

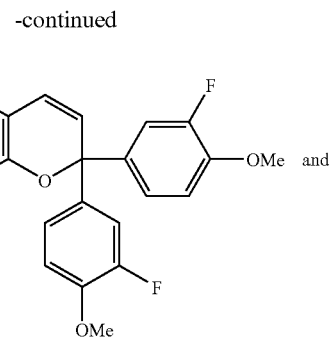

and

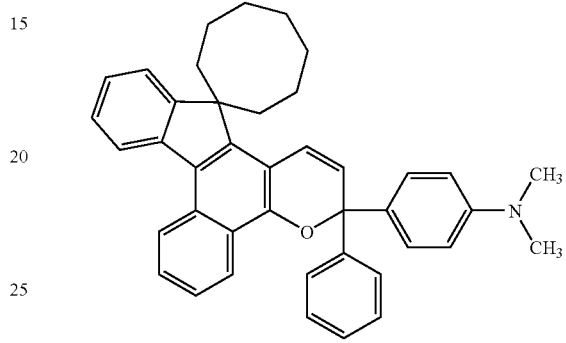

Since these photochromic compounds develop an appropriate color tone, different kinds of photochromic compounds can be mixed together and used as appropriate.

In the compositions of the present invention, the photochromic compound is suitably added in an amount of 0.01 to 20 parts by weight based on 100 parts by weight of the radical polymerizable monomer mixture. When the amount of the photochromic compound is smaller than 0.01 parts by weight, a developed color density may be low, while when the amount is larger than 20 parts by weight, the photochromic compound does not fully dissolve in the polymerizable monomers and is therefore dispersed in the mixture non-uniformly, so that non-uniformity in developed color density may result. Therefore, the amount of the photochromic compound is more preferably 0.05 to 15 parts by weight, particularly preferably 0.1 to 10 parts by weight, based on 100 parts by weight of the radical polymerizable monomer mixture. Further, when the compositions of the present invention are used as a coating agent for optical materials, an appropriate developed color density can be obtained by increasing the content of the photochromic compound when the thickness of a coating layer is small and decreasing the content of the photochromic compound when the thickness of the coating layer is small. More specifically, when the thickness of the coating layer is about 10 μm, the amount of the photochromic compound is particularly suitably about 5 to 15 parts by weight based on 100 parts by weight of the radical polymerizable monomer mixture, and when the thickness of the coating layer is about 50 μm, the amount of the photochromic compound is particularly suitably about 0.1 to 5 parts by weight based on 100 parts by weight of the radical polymerizable monomer mixture.

When an adhesive layer is formed on the surface of a lens substrate in advance, the above first and second coating compositions can provide a photochromic coating layer which adheres to the substrate as in the case of an adhesive photochromic coating agent disclosed in Japanese Patent Application No. 2001-227374 (which has already been laid-open as the pamphlet of International Publication No. 03/011967).

The adhesive layer is a layer for adhering the coating layer to the substrate and refers to a layer formed by applying an adhesive on the substrate and curing the applied adhesive as required. As the adhesive, known adhesives can be used without any restrictions. Specific examples of suitable adhesives include acrylic photocuring adhesives MO5, UT20, HV16, V300, A100 and A200 (products of ARDEL CO., LTD.). These acrylic photocuring adhesives can also be used by adding organic solvents such as methanol, ethanol and isopropyl alcohol to the adhesives as appropriate and adjusting the resulting mixture to a suitable viscosity. Further, a method for applying the adhesive layer is not particularly limited, and known coating methods can be used without any restrictions. Specific examples thereof include methods of applying the coating agent by such methods as spin coating, spray coating, dip coating and dip-spin coating. Further, if necessary, a pretreatment may be performed on a substrate on which the adhesive layer is not yet applied and a substrate on which the adhesive layer has already been applied but the composition of the present invention is not yet applied. Illustrative examples of the pretreatment include a chemical treatment using a basic aqueous solution or an acidic aqueous solution, a polishing treatment using a polishing agent, plasma treatments using atmospheric plasma and low pressure plasma, a corona discharge treatment, a flame treatment and a UV ozone treatment. In view of adhesion between the plastic lens and the coating layer, an alkali treatment, the plasma treatment or the corona treatment is suitably used. Further, two or more of the above different pretreatments may be used in combination.

Although the above first and second coating compositions exhibit the above effect, they have such an excellent characteristic that they can provide a photochromic coating layer having high adhesion and high adhesion durability even to a substrate having no adhesive layer, when they further contain an amine compound in an amount of 0.1 to 20 parts by weight based on 100 parts by weight of all radical polymer components. However, this excellent effect when the specific amount of the amine compound is contained is also exhibited when no photochromic compound is contained (refer to reference examples to be described later). Therefore, compositions which contain an amine compound in an amount of 0.1 to 20 parts by weight based on 100 parts by weight of polymerizable monomers whose composition is the same as that of the first or second coating composition and which contain no photochromic compound are also useful as coating compositions. Hereinafter, amine compounds which can be used in the present invention will be described.

Description of Amine Compounds

As the amine compound, compounds having an amino group can be used without any restrictions. Specific examples of amine compounds which can be suitably used include non-polymerizable low molecular weight amine compounds such as triethanolamine, N-methyldiethanolamine, triisopropanolamine, 4,4-dimethylaminobenzophenone and diazabicyclooctane; amine compounds having a polymerizable group such as N,N-dimethylaminoethyl methacrylate and N,N-diethylaminoethyl methacrylate; and amine compounds having a silyl group such as n-(hydroxyethyl)-N-methylaminopropyltrimethoxysilane, dimethoxyphenyl-2-piperidinoethoxysilane, N,N-diethylaminomethyltrimethylsilane and (N,N-diethyl-3-aminopropyl)trimethoxysilane.

These amine compounds can be used alone or in admixture of two or more. The amine compound is contained in an amount of 0.1 to 20 parts by weight based on 100 parts by weight of all radical polymerizable monomers. When the amount of the amine compound is smaller than 0.1 parts by weight or larger than 20 parts by weight, an effect of improving adhesion between the coating layer and a substrate having no adhesive layer is not attained. In addition, when the amount of the amine compound is higher than 20 parts by weight, yellowing of the coating layer is liable to occur, and the photochromic properties of the photochromic coating layer to be obtained deteriorate disadvantageously. From the viewpoint of the effect, the content of the amine compound is suitably 0.5 to 10 parts by weight, particularly suitably 1 to 10 parts by weight, based on 100 parts by weight of all radical polymerizable monomer components.

When the first or second coating composition is applied to the surface of a substrate such as a plastic lens after addition of a radical polymerization initiator to the composition and then cured, the composition can provide a coating film (coating layer) which adheres to a substrate and does not come off easily even under high humidity conditions, and the composition can be suitably used as a coating agent for such a substrate. Hereinafter, radical polymerization initiators which are used in the compositions of the present invention will be described.

Description of Radical Polymerization Initiator

The first coating composition and the second coating composition preferably contain a photopolymerization initiator so as to be cured by light.

The photocuring coating compositions of the present invention preferably contain a photopolymerization initiator so as to be cured by light.

Specific examples of the photopolymerization initiator include monoacylphosphine oxide based compounds such as 2,6-dimethylbenzoyldiphenylphosphine oxide, 2,4,6-trimethylbenzoyldiphenylphosphine oxide, 2,6-dichlorbenzoyldiphenylphosphine oxide and 2,6-dimethoxybenzoyldiphenylphosphine oxide; bisacylphosphine oxide based compounds such as bis(2,6-dimethoxybenzoyl)-2,4,4-trimethylpentylphosphine oxide, bis(2,6-dimetylbenzoyl)-2,4,4-trimethylpentylphosphine oxide, bis(2,4,6-trimethylbenzoyl)-2,4,4-trimethylpentyl phosphine oxide, bis(2,6-dichlorbenzoyl)-2,4,4-trimethylpentylphosphine oxide, bis(2,4,6-trimethylbenzoyl)-phenylphosphine oxide and bis(2,4,6-trimethoxybenzoyl)-phenylphosphine oxide; benzophenol, acetophenone, 4,4'-dichlorobenzophenone, methylphenylglyoxylate, thioxanthone, 2,4-dimethyl thioxanthone, 2-methyl thioxanthone, 2-chlor thioxanthone, diisopropyl thioxanthone, 2,4-diethyl thioxanthone, 2,4-dichloro thioxanthone, 2-isopropyl thioxanthone, bis(η5-2,4-cyclopentadiene-1-yl)-bis(2,6-difluoro-3-(1H-pyrrole-1-yl)-phenyl)titanium, 3,3',4,4'-tetra(t-butylperoxycarbonyl)benzophenone, camphorquinone, dibenzosuberone, 2-ethyl anthraquinone, 4',4"-diethylisophthalophenone, 9,10-phenanthrenequinone, 1-phenyl-1,2-propanedione-2(O-ethoxycarbonyl)oxime, benzophenone, methyl orthobenzoylbenzoate, orthobenzoylbenzoic acid, 4-benzoyl-4'-methyldiphenyl sulfide, 2,2-dimethoxy-1,2-diphenylethane-1-one, 2-benzyl-2-dimethylamino-1-(4-morpholinophenyl)-butanone-1, 2-methyl-1-[4-(methylthio)phenyl]-2-morpholinopropane-1-one, 1-hydroxy-cyclohexyl-phenyl-ketone, 1-[4-(2-hydroxyethoxy)-phenyl]-2-hydroxy-2-methyl-1-propane-1-one, 2-hydroxy-2-methyl-1-phenyl-propane-1-one, 4-phenyl benzophenone, hydroxy benzophenone, 3,3'-dimethyl-4-methoxy benzophenone, benzoin, benzoin methyl ether, benzoin ethyl ether, benzoin isopropyl ether, benzoin isobutyl ether, 4-phenoxydichloroacetophenone, 4-t-butyl-dichloroacetophenone, 4-t-butyl-trichloroacetophenone, diethoxyacetophenone, 1-(4-isopropylphenyl)-2-hydroxy-2-methylpropane-1-one, 1-(4-dodecylphenyl)-2-hydroxy-2-methylpropane-1-one, and 4-(2-hydroxyethoxy)-phenyl(2-hydroxy-2-propyl)ketone.

These photopolymerization initiators are preferably used in an amount of 0.001 to 5 parts by weight based on 100 parts by weight of the radical polymerizable monomer mixture. The above photopolymerization initiators may be used alone or in admixture of two or more.

Further, in the present invention, in place of the photopolymerization initiator or together with the photopolymerization initiator, a thermal polymerization initiator can be used. The thermal polymerization initiator is not particularly limited, and known thermal polymerization initiators can be used. Representative examples thereof include diacyl peroxides such as benzoyl peroxide, p-chlorobenzoyl peroxide, decanoyl peroxide, lauroyl peroxide and acetyl peroxide; peroxy esters such as t-butylperoxy-2-ethyl hexanoate, t-butylperoxy dicarbonate, cumylperoxy neodecanate and t-butylperoxy benzoate; peroxy carbonates such as diisopropylperoxy dicarbonate, di-2-ethylhexylperoxy dicarbonate and di-sec-butyloxy carbonate; and azo compounds such as 2,2'-azobisisobutylonitrile, 2,2'-azobis(4-dimethylvaleronitrile), 2,2'-azobis(2-methylbutylonitrile) and 1,1'-azobis(cyclohexane-1-carbonitrile).

The amounts of these thermal polymerization initiators vary according to polymerization conditions, the kinds of the initiators and the kinds and composition of radical polymerizable monomers and cannot be limited to particular amounts. However, they are suitably used in an amount of 0.01 to 10 parts by weight based on 100 parts by weight of the radical polymerizable monomer mixture. The above thermal polymerization initiators may be used alone or in admixture of two or more.

Description of Other Additives

To the first and second coating compositions, additives such as a surfactant, antioxidant, radical scavenger, ultraviolet stabilizer, ultraviolet absorber, mold releasing agent, coloration inhibitor, antistatic agent, fluorescent dye, dye, pigment, perfume and plasticizer may be further added so as to improve the durability of a photochromic compound when the photochromic compound is added and to improve a color developing rate, a color fading rate and moldability. As these additives, known compounds are used without any restrictions.

For example, as the surfactant, any of nonionic, anionic and cationic surfactants can be used. However, the nonionic surfactant is preferably used from the viewpoint of solubility in the polymerizable monomers. Specific examples of nonionic surfactants which can be suitably used include sorbitan fatty acid ester, glycerine fatty acid ester, decaglycerine fatty acid ester, propylene glycol•pentaerythritol fatty acid ester, polyoxyethylene sorbitan fatty acid ester, polyoxyethylene sorbit fatty acid ester, polyoxyethylene glycerine fatty acid ester, polyethylene glycol fatty acid ester, polyoxyethylene alkyl ether, polyoxyethylene phytosterol•phytostanol, polyoxyethylene polyoxypropylene alkyl ether, polyoxyethylene alkyl phenyl ether, polyoxyethylene castor oil•hardened castor oil, polyoxyethylene lanolin•lanolin alcohol•beeswax derivatives, polyoxyethylene alkylamine•fatty acid amide, polyoxyethylene alkyl phenyl formaldehyde condensate, and single chain polyoxyethylene alkyl ether. These surfactants may be used in admixture of two or more. The surfactant is preferably added in an amount of 0.1 to 20 parts by weight based on 100 parts by weight of the radical polymerizable monomer mixture.

Further, as the antioxidant, radical scavenger, ultraviolet stabilizer and ultraviolet absorber, a hindered amine light stabilizer, a hindered phenol antioxidant, a phenolic radical scavenger, a sulfur based antioxidant, a benzotriazole based compound and a benzophenone based compound can be suitably used. These antioxidant, radical scavenger, ultraviolet stabilizer and ultraviolet absorber may be used in admixture of two or more. Further, when these non-polymerizable compounds are used, the surfactant and the antioxidant, radical scavenger, ultraviolet stabilizer and ultraviolet absorber may be used in combination. These antioxidant, radical scavenger, ultraviolet stabilizer and ultraviolet absorber are preferably added in an amount of 0.001 to 20 parts by weight based on 100 parts by weight of the radical polymerizable monomer mixture.

When the first and second coating compositions are used as a coating agent for optical materials, they suitably have a viscosity at 25° C. of 20 to 1,000 cP, particularly suitably 50 to 800 cP, more suitably 70 to 500 cP, because a coating film having a desired thickness is obtained easily by spin coating. With the viscosity range, it is easy to adjust the thickness of a coating layer to be described later to be rather thick as 10 to 100 μm, and particularly when a photochromic compound is added, the compositions can exhibit satisfactory photochromic properties.

To adjust the viscosities of the compositions to such a range, a high viscosity radical polymerizable monomer having a viscosity of 200 cP or higher, preferably 500 cP or higher, more preferably 2,000 cP or higher is mixed into the present compositions as appropriate, because radical polymerizable monomers which improve adhesion and photochromic properties often have a low viscosity of 100 cP or lower.

Further, when the first and second coating compositions are used as a coating material for ophthalmic lenses, the contents of the constituents, particularly the radical polymerizable monomers, are preferably adjusted such that the refractive indices of the cured products of the compositions are nearly equal to those of the ophthalmic lenses. In general, the contents of the constituents are adjusted such that the cured products have a refractive index of about 1.48 to 1.75.

Preparation of Compositions of Present Invention

Hereinafter, the compositions of the present invention including the first coating composition and second coating composition of the present invention and preparation methods thereof will be described.

Methods for preparing the compositions of the present invention are not particularly limited, and the present compositions can be prepared easily by weighing given amounts of components and mixing them together. The order of addition of the components is not particularly limited. That is, all components may be added simultaneously, or it is also possible to mix only monomer components in advance and then add and mix a photochromic compound and other additives right before polymerization, for example. When the composition of the present invention which contains an amine compound and an epoxy monomer as a radical polymerizable monomer is stored, it is preferable for obtaining high storage stability that the epoxy monomer and the amine compound be stored in separate packages and then mixed before use. In this case, other components are separated and stored in the above two packages.

As described above, the compositions of the present invention, particularly the compositions of the present invention which contain photochromic compounds, can be suitably used as coating agents for optical material substrates such as plastic lenses. Hereinafter, a method of using the present compositions in such an application will be described.

Optical material substrates on which coating agents comprising the compositions of the present invention are applied are not particularly limited and are exemplified by known optical materials such as glass and plastic ophthalmic s lenses and window glass for houses and automobiles. These coating agents are particularly suitably used on the plastic ophthalmic lenses.

As the plastic ophthalmic lenses, plastic ophthalmic lenses comprising a (meth)acrylic resin, a polycarbonate resin, an allyl resin, a thiourethane resin, an urethane resin or a thioepoxy resin can be used. However, glass lenses comprising a thiourethane resin, an urethane resin, a thioepoxy resin or an allyl resin are particularly suitably used, because such glass lenses have excellent adhesion to coating layers formed by the compositions of the present invention and excellent adhesion durability (adhesion durability particularly when stored under high humidity conditions).

When the coating agents comprising the compositions of the present invention are applied to a plastic lens substrate, the plastic lens is preferably subjected to a pretreatment for the purpose of improving adhesion in advance. Illustrative examples of the pretreatment include a chemical treatment using a basic aqueous solution or an acidic aqueous solution, a polishing treatment using a polishing agent, plasma treatments using atmospheric plasma and low pressure plasma, a corona discharge treatment, a flame treatment and a UV ozone treatment. In view of adhesion between the plastic lens and the coating layer, an alkali treatment, the plasma treatment or the corona discharge treatment is suitably used. Further, two or more of different pretreatments may be used in combination as the pretreatment for the plastic lens.

To form the coating layer on the surface of a substrate, the coating agent comprising the composition of the present invention is applied to the surface(s) (front surface and/or rear surface) of the substrate and then cured after such a pretreatment is conducted as required. A method for applying the coating agent is not particularly limited, and known coating methods can be used without any restrictions. Specific examples thereof include methods of applying the coating agent by such methods as spin coating, spray coating, dip coating and dip-spin coating. The thickness of the coating agent layer applied by such a method (which corresponds to the thickness of the cured coating layer) is not particularly limited. However, particularly when a photochromic compound is added, the thickness is preferably relatively large, since a satisfactory developed color density can be obtained and durability which is a photochromic property is also good even if the content of the photochromic compound is low. Meanwhile, however, since initial yellowness increases as the thickness of the coating layer increases, the thickness of the cured coating layer is preferably 10 to 100 am, particularly preferably 20 to 50 μm. Such a thick coating layer can be attained easily by adjusting the viscosity at 25° C. of the curable composition to the above range as described above. For comparison, a coating composition such as a coating agent for hard coat which is generally used on plastic lenses contains a solvent and the like so as to obtain a uniform coating film, so that its viscosity at 25° C. is generally 5 cP or lower and the thickness of a coating layer obtained from the coating composition is several micrometers or smaller. As compared with such a thickness, the above thickness of 10 to 100 μm is very large.

Further, as a curing method, a photocuring method or a heat curing method is used as appropriate according to the kind of a radical polymerization initiator to be used. In view of the physical properties and appearance of a coating film to be obtained, it is suitable to employ a method comprising curing the coating agent by irradiation of light by use of a photopolymerization initiator and heating the cured agent so as to complete polymerization. In this case, a thermal polymerization initiator may be used in combination with the photopolymerization initiator. As a light source used for photocuring, lamps with or without electrodes such as a metal halide lamp, a very high pressure mercury lamp, a high pressure mercury lamp, a medium pressure mercury lamp, a bactericidal lamp, a xenon lamp, a carbon arc and a tungsten lamp can be used. Further, an electron beam may be used as the light source. In this case, the coating layer can be cured without addition of the photopolymerization initiator. Further, illustrative examples of the heat curing method include a method comprising heating the coating agent in a polymerization furnace so as to thermally polymerize it and a method comprising irradiating the coating agent with infrared light in a polymerization furnance so as to polymerize and cure it.

Optical materials on which the coating layer comprising the cured product of the composition of the present invention has been formed as described above can be used as they are. However, it is more preferred that the optical materials be coated with a hard coat material. The abrasion resistance of the optical materials can be improved by coating them with a hard coat layer. As the hard coat layer, known hard coat layers can be used without any restrictions. Illustrative examples of the hard coat layers include those obtained by coating and curing coating agents for hard coat which are composed essentially of a silane coupling agent or sols of oxides of silicon, zirconium, antimony, aluminum and the like and those obtained by coating and curing coating agents for hard coat which are composed essentially of organic polymers. In the present invention, adequate adhesion can be obtained more firmly and easily by incorporating the silyl monomer in the coating composition.

Further, it is also possible to subject the coating layer comprising the composition of the present invention and, as required, the hard coat layer formed on the coating layer to such processing and secondary treatments as an antireflection treatment and an antistatic treatment by vapor deposition of a thin film comprising a metal oxide such as $SiO_2$, $TiO_2$ or $ZrO_2$ or coating of a thin film comprising an organic polymer.

Hereinafter, the present invention will be further described with reference to Examples and Comparative Examples. However, the present invention shall not be limited to these Examples.

EXAMPLES

Hereinafter, the abbreviations and names of compounds used will be presented. As for other radical polymerizable monomers, the L scale Rockwell hardnesses of cured products obtained when the compounds (monomers) are homopolymerized by cast polymerization (comprising heating the monomers from 30° C. to 90° C. in 20 hours and then polymerizing them at 120° C. for 2 hours) are presented in parentheses with "HOMO-HL". The hardnesses were measured by use of an AKASHI Rockwell hardness meter (model: AR-10) after the cured products were kept in a room of 25° C. for 1 day. Glycidyl methacrylate is an epoxy monomer.

(1) Radical Polymerizable Monomer

Component (A1): Silyl Monomer
TMSiMA: γ-methacryloyloxypropyltrimethoxysilane
DMSiMA: γ-methacryloyloxypropylmethyldimethoxysilane, Component (A1): Isocyanate Monomer
MOI: 2-isocyanate ethoxy methacrylate
Component (A2): Maleimide Compound
PMI: N-phenyl maleimide LMI: N-lauryl maleimide
BMI-1: 4,4'-diphenylmethane bismaleimide
BMI-2: 2,2-bis[4-(4-maleimidephenoxy)phenyl]propane Component (B1): Ester Linkage Containing Monomer
EB6A: polyester oligomer hexaacrylate (DAICEL UCB CO., LTD., EB1830)
HP: hydroxypivalic acid neopentyl glycol diacrylate
EBA: acrylated acryl copolymer (DAICEL UCB CO., LTD.: EB1701)
FA3: ω-carboxy-polycaprolactone monoacrylate having an average molecular weight of 458
HOA: 2-acryloyloxyethylsuccinic acid
HOB: 2-acryloyloxyethylhexahydro phthalate
DPCA: polycaprolactone modified dipentaerythritol hexaacrylate having an average molecular weight of 1,200 (Nippon Kayaku Co., Ltd.: DPCA-60)

Component (C1): Radical Polymerizable Monomer Different from Component (A1) and Component (B1)
High Hardness Monomer
TMPT: trimethylolpropane trimethacrylate (HOMO-HL=122)
GMA: glycidyl methacrylate (HOMO-HL=80) (Note: The monomer is an epoxy monomer.)
BPE: 2,2-bis(4-methacryloyloxyethoxyphenyl)propane (HOMO-HL=110)
U6A: urethane oligomer hexaacrylate (HOMO-HL=100) (Shin-Nakamura Chemical Corporation: U-6HA)
Low Hardness Monomer
9GA: polyethylene glycol diacrylate having an average molecular weight of 532 (HOMO-HL<20)
MePEGMA: methyl ether polyethylene glycol methacrylate having an average molecular weight of 1,000 (HOMO-HL<20)
BPEO: 2,2-bis(4-acryloyloxypolyethyleneglycolphenyl) propane an average molecular weight of 776 (HOMO-HL<40)

(2) Photochromic Compound
Chromene 1 (hereinafter also referred to as "c1"): Compound of the Following Structure

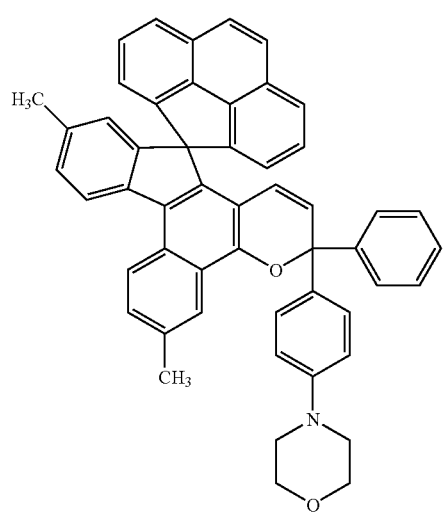

Chromene 2 (hereinafter also referred to as "c2"): Compound of the Following Structure

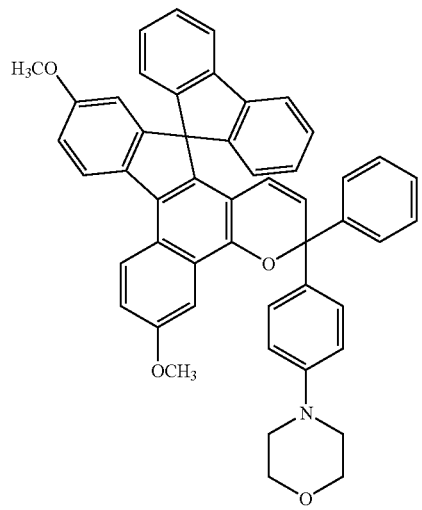

Chromene 3 (hereinafter also referred to as "c3"): Compound of the Following Structure

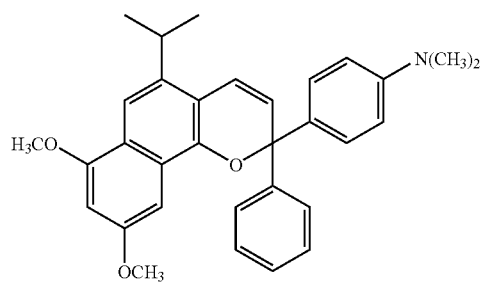

Chromene 4 (hereinafter also referred to as "c4"): Compound of the Following Structure

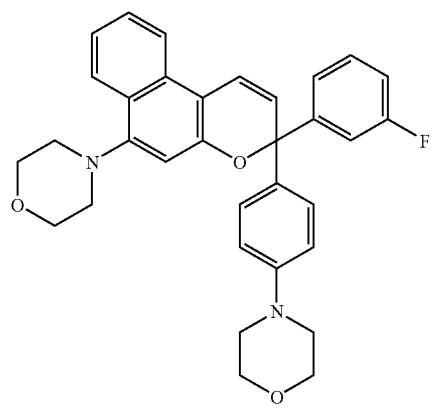

Chromene 5 (hereinafter also referred to as "c5"): Compound of the Following Structure

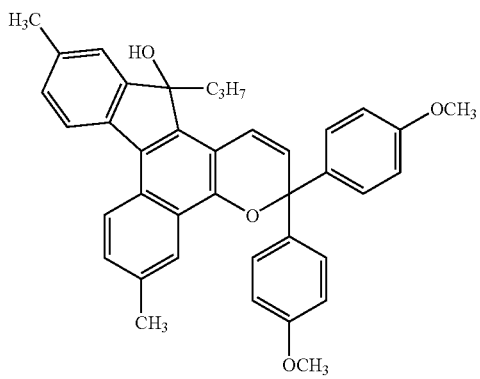

Chromene 6 (hereinafter also referred to as "c6"): Compound of the Following Structure

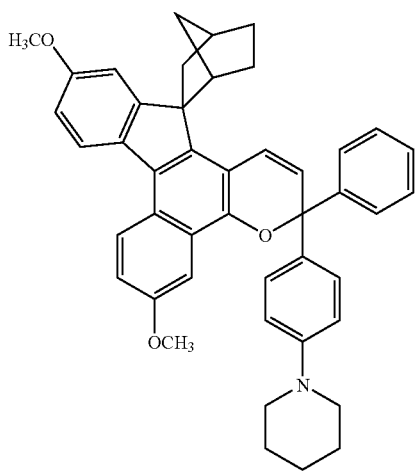

Chromene 7 (hereinafter also referred to as "c7"): Compound of the Following Structure

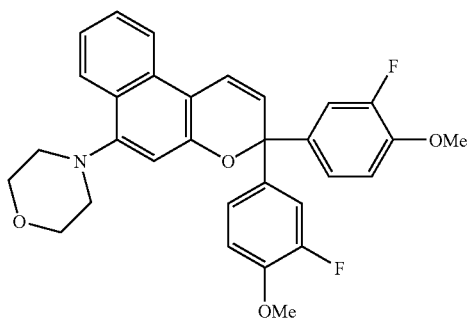

Chromene 8 (hereinafter also referred to as "c8"): Compound of the Following Structure

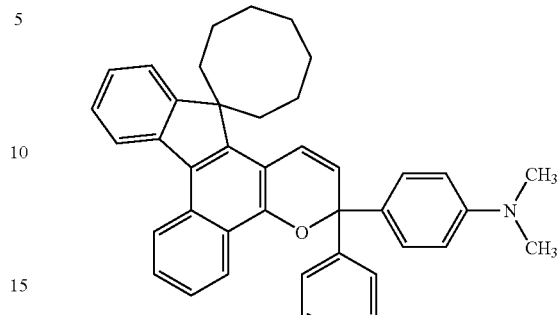

(3) Amine Compound
NMDEA: N-methyldiethanolamine
DMEMA: N,N-dimethylaminoethyl methacrylate (4) Polymerization Initiator
CGI1800: mixture comprising
1-hydroxy-cyclohexyl-phenyl-ketone and bis(2,6-dimethoxybenzoyl)-2,4,4-trimethyl-pentylphosphine oxide in a ratio of 3:1

(5) Stabilizer
LS765: bis(1,2,2,6,6-pentamethyl-4-piperidyl)sebacate (6) Plastic Lens
CR39 (allyl resin plastic lens; refractive index=1.50)
MR (thiourethane resin plastic lens; refractive index=1.60)
TE (thioepoxy resin plastic lens; refractive index=1.71)
SPL (methacryl resin plastic lens; refractive index=1.54)
TR (urethane resin plastic lens; refractive index=1.53)

(7) Adhesive Layer
UT20 (acrylic photocuring adhesive: ARDEL CO., LTD.)

I. Examples, Comparative Examples and Reference Examples of First Coating Composition Reference Example 1

Preparation of Coating Agent A

Five parts by weight of N-methyldiethanolamine, 5 parts by weight of LS765, and 0.2 parts by weight of CGI1800 as a polymerization initiator were added to 100 parts by weight of polymerizable monomers comprising 10 parts by weight of γ-methacryloyloxypropyltrimethoxysilane, 20 parts by weight of trimethylolpropane trimethacrylate, 20 parts by weight of polyethylene glycol diacrylate having an average molecular weight of 532, 30 parts by weight of urethane oligomer hexaacrylate, 10 parts by weight of glycidyl methacrylate and 10 parts by weight of hydroxypivalic acid neopentyl glycol diacrylate. Then they were fully mixed so as to obtain a photocuring coating agent A. The kinematic viscosity of the mixed solution was measured by use of a Cannon-Fenske viscosimeter. The measurement was made at 25° C. in accordance with JIS K2283. When the viscosity of the sample was calculated from the obtained kinematic viscosity and the sample's specific viscosity measured in advance by use of the expression [viscosity (cP)=kinematic viscosity (cSt)×specific viscosity (G/cm$^3$)], it was 110 cP.

Preparation of Sample

Preparation of Sample 1: The whole convex surface of a thiourethane resin plastic lens (MR) was subjected to an atmospheric pressure plasma treatment for 90 seconds by use of atmospheric pressure plasma irradiation equipment (ST-7000 of KEYENCE CORPORATION), and the convex surface was then washed with about 2 ml of hot water of 40° C. Then, the photocuring coating agent A was spin-coated by use of the spin-coater 1H-DX2 of MIKASA CO., LTD. with the revolution speed gradually increased (i.e., at 60 r.p.m for 40 seconds, 400 r.p.m for 2 seconds, and then 600 r.p.m for 4 seconds). Then, the lens was held with the convex surface coated with the coating agent A facing upward and then exposed to a metal halide lamp equipped with a cold reflector with an exposure intensity of about 100 mW/cm$^2$ in a nitrogen gas atmosphere for 180 seconds so as to cure the coating agent A. Then, the lens was held with the convex surface facing downward and then heated at 120° C. for 1 hour. The thickness of the coating layer (coating layer A) formed on the plastic lens was measured by use of thin film measuring equipment of Filmetrics Japan, Inc. By using this lens as a sample (sample 1), an adhesion test 1 for evaluating adhesion between the lens and the coating layer which will be described later was carried out.

Preparation of Sample 2: Another plastic lens having a coating layer (coating layer A) comprising the cured product of the coating agent A was obtained in the same manner as the sample 1 was produced. Then, after the thickness of the coating layer was measured, the plastic lens was washed with acetone and then fully air-dried so as to be clean. Then, the plastic lens was immersed in a 10% NaOH aqueous solution for 10 minutes, and the plastic lens was then fully washed with water and air-dried again. This lens was immersed in a coating agent for hard coat (hard coat solution TS56H of Tokuyama Corporation), pulled out at 30 cm/min, pre-dried at 60° C. for 15 minutes and heated at 130° C. for 2 hours so as to cure the coating agent. Thereby, a sample (sample 2) having the hard coat layer was prepared.

Preparation of Sample 3: A sample 3 was prepared in the same manner as the sample 2.

Evaluations of Samples (1) Adhesion between Lens and Coating Layer A (hereinafter also referred to as "adhesion 1")

On the surface of the coating layer of the sample 1 which had been left to stand at room temperature for 0.5 to 24 hours after cured, 100 grids each having a size of 1 mm×1 mm were formed by use of a cutter knife. Subsequently, a grid test in which a commercially available scotch tape was stuck on the grids and the degree of peeling of the coating layer when the scotch tape was peeled off quickly was observed visually was conducted so as to evaluate adhesion between the lens and the coating layer. The evaluation was made based on the number of unpeeled grids out of the 100 grids, i.e., on the following 5 scale.

⊚: (number of unpeeled grids after evaluation)/(number of grids before evaluation=100)=100/100
○: 99 to 95/100
Δ: 94 to 80/100
▲: 79 to 50/100
×: 49 or less/100

The results are shown in Table 3 together with the results of other Reference Examples.

(2) Adhesion between Coating Layer A and Hard Coat Layer (hereinafter also referred to as "adhesion 2")

On the surface of the sample 2 which had been left to stand at room temperature for 0.5 to 24 hours after formation of the hard coat layer, 100 grids each having a size of 1 mm×1 mm were formed by use of a cutter knife, and a grid test was conducted as in the above (1) so as to evaluate adhesion 2. The results are shown in Table 3 together with the results of other Reference Examples. The number of unpeeled grids in this case refers to the number of grids where neither the coating layer A nor the hard coat layer was peeled off.

(3) Adhesion after Humidity Test (hereinafter also referred to as "adhesion 3")

After the sample 3 had been left to stand at a temperature of 40° C. and a humidity of 90% RH for 1 week after formation of the hard coat layer, a grid test was conducted as in the above (1). The results are shown in Table 3 together with the results of other Reference Examples. The number of unpeeled grids in the evaluation refers to the number of grids where neither the coating layer A nor the hard coat layer was peeled off as in the above (2).

Reference Examples 2 to 10

The components shown in Table 1 were mixed in the same manner as the coating agent A was produced so as to obtain photocuring coating agents B to F. The components (C1) shown in Table 1 are radical polymerizable monomers other than the components (A1) (silyl monomers and/or isocyanate monomers) and the components (B1) (ester-linkage-containing monomers).

Samples were prepared in the same manner as in Reference Example 1 except that the coating agents and lens substrates shown in Table 3 were used, and the samples were evaluated. The results of the evaluations are shown in Table 3.

Comparative Examples 1 to 7

The components shown in Table 2 were mixed in the same manner as the coating agent A was produced so as to obtain photocuring coating agents R, S and V. R and S are coating agents for comparative experiments containing no ester-linkage-containing monomer, and V is a coating agent for a comparative experiment containing neither a silyl monomer nor an isocyanate monomer.

Samples were prepared in the same manner as in Reference Example 1 except that the coating agents and lens substrates shown in Table 4 were used, and the samples were evaluated. The results of the evaluations are shown in Table 4. As for Comparative Example 7, only adhesion 1 was evaluated.

TABLE 1

| Coating Agent | Component (A1) (parts by weight) | Component (C1) (parts by weight) | Component (B1) (parts by weight) |
| --- | --- | --- | --- |
| A | TMSiMA 10 | TMPT/9GA/U6A/GMA 20/20/30/10 | HP 10 |
| B | TMSiMA 5 | TMPT/BPEO/9GA/GMA 20/40/10/5 | EB6A/HP 10/10 |
| C | TMSiMA 5 | TMPT/BPE/U6A/MePEGMA/GMA 10/40/10/15/10 | EBA 10 |
| D | TMSiMA 15 | TMPT/BPEO/9GA/GMA 10/30/15/5 | EB6A/FA3 20/5 |

TABLE 1-continued

| | | | | |
|---|---|---|---|---|
| E | DMSiMA 5 | TMPT/BPE/U6A/9GA/GMA 10/30/10/20/10 | HOA/DPCA 5/10 | |
| F | MOI 5 | TMPT/BPEO/U6A/9GA/GMA 13/35/10/20/10 | HOB 7 | |
| G | TMSiMA 10 | TMPT/9GA/U6A/GMA 20/25/25/10 | HP 10 | |
| H | TMSiMA 10 | TMPT/BPEO/9GA/GMA 15/40/15/10 | HP 10 | |
| I | TMSiMA 10 | TMPT/BPEO/9GA/GMA 15/40/10/5 | EB6A/HP 10/10 | |
| J | TMSiMA 5 | BPE/MePEGMA/GMA 50/10/10 | EB6A/HP 15/10 | |
| K | TMSiMA 5 | BPEO/9GA/U6A/GMA 30/10/15/10 | EB6A/HP/FA3 10/10/10 | |
| L | TMSiMA 10 | TMPT/BPEO/BPE/U6A/GMA 10/35/15/15/10 | FA3 5 | |

| Coating Agent | Amine Compound (parts by weight) | Polymerization Initiator (parts by weight) | Stabilizer (parts by weight) | Chromene Compound (parts by weight) | Viscosity (cP) |
|---|---|---|---|---|---|
| A | NMDEA 5 | CGI1800 0.2 | LS765 5 | — | 110 |
| B | NMDEA 3 | CGI1800 0.3 | LS765 5 | — | 115 |
| C | NMDEA 5 | CGI1800 0.2 | LS765 5 | — | 104 |
| D | DMEMA 5 | CGI1800 0.2 | LS765 5 | — | 123 |
| E | NMDEA 5 | CGI1800 0.2 | LS765 5 | — | 98 |
| F | NMDEA 3 | CGI1800 0.2 | LS765 5 | — | 109 |
| G | NMDEA 3 | CGI1800 0.5 | LS765 5 | C1 3 | 135 |
| H | NMDEA 1 | CGI1800 0.5 | LS765 5 | C1 3 | 102 |
| I | NMDEA 1 | CGI1800 0.5 | LS765 5 | C1 3 | 111 |
| J | NMDEA 5 | CGI1800 0.45 | LS765 5 | C2 3 | 128 |
| K | NMDEA 5 | CGI1800 0.4 | LS765 5 | C3 3 | 137 |
| L | DMEMA 3 | CGI1800 0.5 | LS765 5 | C4 3 | 108 |

TABLE 2

| Coating Agent | Component (A1) (parts by weight) | Component (C1) (parts by weight) | Component (B1) (parts by weight) |
|---|---|---|---|
| M | TMSiMA 5 | TMPT/BPEO/9GA/GMA 12/40/25/15 | HOA 8 |
| N | TMSiMA 10 | BPEO/9GA/U6A/GMA 40/10/10/10 | HOB/HP 10/10 |
| O | DMSiMA 10 | TMPT/BPE/U6A/GMA 15/40/10/10 | EBA 15 |
| P | TMSiMA 15 | TMPT/BPEO/9GA/GMA 5/30/15/10 | EBA/EB6A 10/15 |
| Q | DMSiMA 10 | TMPT/BPE/MePEGMA/GMA 10/40/15/10 | DPCA 15 |
| R | TMSiMA 5 | TMPT/BPEO/U6A/9GA/GMA 20/40/10/15/10 | — |
| S | TMSiMA 10 | TMPT/BPE/9GA/U6A/GMA 5/60/10/15/5 | — |
| T | TMSiMA 5 | TMPT/BPE/9GA/U6A 10/50/10/15 | HP 10 |
| U | DMSiMA 30 | TMPT/BPEO/U6A/MePEGMA/GMA 10/10/30/10/10 | — |
| V | — | TMPT/BPEO/U6A/9GA/GMA 10/40/20/10/10 | EBA 10 |

| Coating Agent | Amine Compound (parts by weight) | Polymerization Initiator (parts by weight) | Stabilizer (parts by weight) | Chromene Compound (parts by weight) | Viscosity (cP) |
|---|---|---|---|---|---|
| M | NMDEA 3 | CGI1800 0.5 | LS765 5 | C5 3 | 95 |

TABLE 2-continued

| | | | | | |
|---|---|---|---|---|---|
| N | DMEMA 7 | CGI1800 0.45 | LS765 5 | C6 3 | 106 |
| O | NMDEA 10 | CGI1800 0.5 | LS765 5 | C7 3 | 140 |
| P | DMEMA 5 | CGI1800 0.5 | LS765 5 | C8 3 | 135 |
| Q | NMDEA 5 | CGI1800 0.5 | LS765 5 | C1/C4/C7/C8 1/1/1/2 | 103 |
| R | NMDEA 3 | CGI1800 0.2 | LS765 5 | — | 120 |
| S | NMDEA 5 | CGI1800 0.25 | LS765 5 | — | 118 |
| T | NMDEA 30 | CGI1800 0.5 | LS765 5 | C1 3 | 114 |
| U | DMEMA 5 | CGI1800 0.5 | LS765 5 | C8 3 | 124 |
| V | NMDEA 3 | CGI1800 0.5 | LS765 5 | — | 112 |

TABLE 3

| Reference Example No. | Coating Agent | Lens Substrate | Film Thickness (μm) | Adhesion 1 | Adhesion 2 | Adhesion 3 |
|---|---|---|---|---|---|---|
| 1 | A | MR | 35 | ◎ | ◎ | ◎ |
| 2 | A | CR39 | 36 | ◎ | ◎ | ◎ |
| 3 | A | TE | 35 | ○ | ◎ | ◎ |
| 4 | A | SPL | 34 | ◎ | ◎ | ◎ |
| 5 | A | TR | 36 | ◎ | ◎ | ○ |
| 6 | B | MR | 35 | ◎ | ◎ | ◎ |
| 7 | C | MR | 33 | ◎ | ◎ | ◎ |
| 8 | D | TR | 40 | ○ | ◎ | ○ |
| 9 | E | SPL | 31 | ◎ | ◎ | ◎ |
| 10 | F | MR | 36 | ◎ | ◎ | ◎ |

TABLE 4

| Comparative Example No. | Coating Agent | Lens Substrate | Film Thickness (μm) | Adhesion 1 | Adhesion 2 | Adhesion 3 |
|---|---|---|---|---|---|---|
| 1 | R | MR | 39 | ◎ | ◎ | ▲ |
| 2 | R | CR39 | 38 | ○ | ◎ | X |
| 3 | R | TE | 39 | ○ | ◎ | X |
| 4 | R | SPL | 40 | ◎ | ◎ | ▲ |
| 5 | R | TR | 41 | ○ | ○ | X |
| 6 | S | MR | 37 | ◎ | ◎ | ▲ |
| 7 | V | MR | 37 | X | — | — |

As is clear from the above Table 3, the coating films obtained by use of the coating agents comprising the compositions of Reference Examples 1 to 10 show good adhesion (adhesion 1) to the lens substrates, good adhesion (adhesion 2) to the hard coat layers, and good adhesion (adhesion 3) after the humidity tests. Meanwhile, as shown by the results of Comparative Examples 1 to 6 in Table 4, when no ester-linkage-containing monomer is contained in the coating agents, adhesion 3 is significantly poor, while adhesion 1 and adhesion 2 are good. In addition, as shown in Comparative Example 7, when no "silyl monomer and isocyanate monomer" are contained in the coating agent, even adhesion 1 is not satisfactory.

Examples 1 to 17

The components shown in Tables 1 and 2 were mixed in the same manner as the coating agent A was obtained so as to obtain photocuring coating agents G to Q comprising first coating compositions containing photochromic compounds. Then, samples 1 to 3 were prepared in the same manner as in Reference Example 1 except that the coating agents and lens substrates shown in Table 5 were used, and the samples 1 were measured for various photochromic properties (a maximum absorption wavelength, a developed color density, a color fading rate and durability) by the following methods. Further, the adhesions 1 to 3 of the above samples 1 to 3 were evaluated as in Reference Example 1. The results are shown in Table 5.

(1) Maximum Absorption Wavelength (λmax)

The sample was exposed to the xenon lamp L-2480 (300 W) SHL-100 of Hamamatsu Photonics Co., Ltd. via an AEROMAS filter (product of Corning Co., Ltd.) for 120 seconds at 20° C.±1° C. and beam intensities at the polymer surface at 365 nm of 2.4 mW/cm$^2$ and 245 nm of 24 μm/cm$^2$ so as to develop color, and the maximum absorption wavelength at that time was determined by use of a spectrophotometer (instantaneous multichannel photodetector MCPD1000) of Otsuka Denshi Kogyo Co., Ltd. The maximum absorption wavelength relates to a color tone at the time of color development.

(2) Developed Color Density

The difference $\{\epsilon(120)-\epsilon(0)\}$ between the absorbance $\{\epsilon(0)\}$ at the above wavelength of the cured product not exposed to light and the absorbance $\{\epsilon(120)\}$ at the maximum absorption wavelength of the cured product after exposed to light for 120 seconds was determined as a developed color density. It can be said that the higher this value is, the better photochromic properties are.

(3) Color Fading Rate

After the cured product was exposed to light for 120 seconds, the exposure to light was stopped, and time "t1/2 (min)" (color fading half life) required by the absorbance at the maximum absorption wavelength of the cured product to decrease to ½ of the above $\{\epsilon(120)-\epsilon(0)\}$ was measured. It can be said that the shorter this time (color fading half life) is, the faster color fading rate is, that is, the better photochromic properties are.

(4) Durability of Photochromic Properties (Durability in Table 5)

To evaluate the durability of the developed color by irradiation of light, the following degradation acceleration test was conducted. That is, the obtained lens having the coating layer containing a photochromic compound was subjected to degradation acceleration for 200 hours by use of the xenon weather meter X25 of SUGA TEST INSTRUMENTS CO., LTD. Subsequently, evaluation of the above developed color density was made before and after the test, the developed color density ($A_0$) before the test and the developed color density ($A_{200}$) after the test were measured, and the value of $\{(A_{200}/A_0) \times 100\}$ was taken as a residual rate (%) which was used as a measure of durability of developed color. The higher the residual rate is, the higher the durability of developed color is.

very much, but the durabilities which are one of photochromic properties are significantly degraded due to the excessively large content of the amine compound. Further, in the case of Comparative Example 13, since the photocuring coating composition (coating agent U) contains no ester-linkage-containing monomer and contains the silyl monomer in an

TABLE 5

| Ex. | Coating Agent | Lens Substrate | Film Thickness (μm) | Adhesion 1 | Adhesion 2 | Adhesion 3 | λmax (nm) | Developed Color Density | Color Fading Half Life (min) | Durability (%) |
|---|---|---|---|---|---|---|---|---|---|---|
| 1 | G | MR | 45 | ◎ | ◎ | ◎ | 610 | 0.82 | 1.3 | 45 |
| 2 | G | CR39 | 44 | ◎ | ◎ | ◎ | 610 | 0.80 | 1.2 | 43 |
| 3 | G | TE | 45 | ○ | ◎ | ◎ | 610 | 0.78 | 1.4 | 42 |
| 4 | G | SPL | 43 | ◎ | ◎ | ◎ | 610 | 0.76 | 1.3 | 40 |
| 5 | G | TR | 46 | ◎ | ◎ | ○ | 610 | 0.81 | 1.2 | 44 |
| 6 | H | MR | 34 | ◎ | ◎ | ◎ | 610 | 0.74 | 1.2 | 38 |
| 7 | I | TR | 36 | ◎ | ◎ | ◎ | 610 | 0.75 | 1.1 | 40 |
| 8 | J | TE | 40 | ○ | ◎ | ○ | 600 | 0.72 | 1.5 | 41 |
| 9 | K | SPL | 44 | ◎ | ◎ | ◎ | 588 | 0.70 | 1.7 | 42 |
| 10 | L | MR | 36 | ◎ | ◎ | ◎ | 474 | 0.92 | 1.6 | 34 |
| 11 | L | CR39 | 35 | ◎ | ◎ | ◎ | 474 | 0.89 | 1.6 | 35 |
| 12 | M | MR | 33 | ◎ | ◎ | ◎ | 576 | 0.78 | 1.5 | 40 |
| 13 | N | MR | 35 | ◎ | ◎ | ◎ | 580 | 0.81 | 1.0 | 41 |
| 14 | O | TE | 45 | ◎ | ◎ | ◎ | 446 | 0.92 | 1.8 | 38 |
| 15 | P | TR | 42 | ◎ | ◎ | ◎ | 586 | 1.03 | 1.7 | 47 |
| 16 | Q | MR | 35 | ◎ | ◎ | ◎ | 480 | 0.83 | 1.7 | 40 |
|  |  |  |  |  |  |  | 590 | 1.05 | 1.7 | 43 |
| 17 | Q | SPL | 34 | ◎ | ◎ | ◎ | 478 | 0.80 | 1.7 | 38 |
|  |  |  |  |  |  |  | 590 | 0.98 | 1.6 | 41 |

Ex.: Example

Comparative Examples 8 to 13

The components shown in Table 2 were mixed in the same manner as the coating agent A was obtained so as to obtain photocuring coating agents T and U containing photochromic compounds. Then, samples 1 to 3 were prepared in the same manner as in Reference Example 1 except that the coating agents and lens substrates shown in Table 6 were used, and the samples 1 were measured for various-photochromic properties (a maximum absorption wavelength, a developed color density, a color fading rate and durability) by the same methods as used in Examples 1 to 17. Further, the adhesions 1 to 3 of the above samples 1 to 3 were evaluated as in Reference Example 1. The results are shown in Table 6.

amount larger than that defined in the present invention, the adhesions are degraded, and photochromic properties (color fading rate and durability) are also degraded.

Example 18

A sample (coating layer thickness: 43 μm) was prepared in the same manner as in Example 1 except that a coating composition having the same composition as that of the composition G except for having no amine compound was used and that a substrate having an adhesive layer formed thereon was used, and adhesion tests were conducted and evaluations of photochromic properties were made on the sample. The results are as follows: adhesion 1=◎, adhesion 2=◎, adhe-

TABLE 6

| C. Ex. | Coating Agent | Lens Substrate | Film Thickness (μm) | Adhesion 1 | Adhesion 2 | Adhesion 3 | λmax (nm) | Developed Color Density | Color Fading Half Life (min) | Durability (%) |
|---|---|---|---|---|---|---|---|---|---|---|
| 8 | T | MR | 36 | ◎ | ◎ | ○ | 610 | 0.78 | 1.0 | 3 |
| 9 | T | CR39 | 36 | ◎ | ◎ | Δ | 610 | 0.80 | 0.9 | 5 |
| 10 | T | TE | 37 | ○ | ◎ | Δ | 610 | 0.81 | 0.8 | 7 |
| 11 | T | SPL | 35 | ◎ | ◎ | Δ | 610 | 0.78 | 1.0 | 5 |
| 12 | T | TR | 34 | ◎ | ◎ | ○ | 610 | 0.76 | 1.0 | 2 |
| 13 | U | MR | 42 | ◎ | ◎ | ▲ | 586 | 0.82 | 2.5 | 5 |

C. Ex.: Comparative Example

As is clear from the above Table 5, the photochromic properties and adhesions of the samples (photochromic plastic lenses) prepared by use of the coating agents comprising the compositions of the present invention in Examples 1 to 17 are satisfactorily good. Meanwhile, as shown in Table 6, in the case of Comparative Examples 8 to 12, since the photocuring coating composition (coating agent T) contains the silyl monomer and the ester-linkage-containing monomer as radical polymerizable monomers, the adhesions are not degraded sion 3=◎, λmax=610 (nm), developed color density =0.77, color fading half life=1.4 (min), durability=40%. The adhesive layer was formed in the following manner. That is, firstly, the whole convex surface of a thiourethane resin plastic lens (MR) was subjected to an atmospheric pressure plasma treatment for 60 seconds by use of atmospheric pressure plasma irradiation equipment (ST-7000 of KEYENCE CORPORATION). Then, UT20 was spin-coated by use of the spin-coater 1H-DX2 of MIKASA CO., LTD. with the revolution speed changed stepwise (i.e., at 50 r.p.m for 20 seconds, 1,500 r.p.m for 5 seconds and 600 r.p.m for 4 seconds). Then, the lens was held with the convex surface coated with UT20 facing upward and exposed to a metal halide lamp equipped with a cold reflector with an exposure intensity of about 100 mW/cm² in a nitrogen gas atmosphere for 120 seconds so as to cure UT20. Thereby, the adhesive layer was formed.

It is understood from this result that even if a first coating composition containing no amine compound is used, a photochromic coating layer having good adhesion and good photochromic properties can be obtained when a substrate having an adhesive layer is used.

Comparative Example 14

A sample (coating layer thickness: 45 μm) was prepared in the same manner as in Example 18 except that a coating composition having the same composition as that of the composition G except for having no component B1 and no amine compound was used, and adhesion tests were conducted and evaluations of photochromic properties were made on the sample. The results are as follows: adhesion 1=◎, adhesion 2=Δ, adhesion 3=▲, λmax=610 (nm), developed color density=0.81, color fading half life=1.5 (min), durability=41%. It is understood from this result that even when a substrate coated with an adhesive is used, satisfactory adhesions cannot be obtained when a coating composition containing no ester-linkage-containing monomer is used.

II. Examples, Comparative Examples and Reference Examples of Second Coating Composition Reference Example 11

Preparation of Coating Agent A'

Three parts by weight of N-methyldiethanolamine, 5 parts by weight of LS765 and 0.2 parts by weight of CGI1800 as a polymerization initiator were added to 100 parts by weight of polymerizable monomers comprising 1.5 parts by weight of 4,4'-diphenylmethane bismaleimide, 18.5 parts by weight of trimethylolpropane trimethacrylate, 30 parts by weight of 2,2-bis(4-acryloyloxypolyethyleneglycolphenyl)propane having an average molecular weight of 776, 20 parts by weight of polyethylene glycol diacrylate having an average molecular weight of 532, 20 parts by weight of urethane oligomer hexaacrylate and 10 parts by weight of glycidyl methacrylate. Then they were fully mixed so as to obtain a photocuring coating agent A'. The kinematic viscosity of the mixed solution was measured by use of a Cannon-Fenske viscosimeter. The measurement was made at 25° C. in accordance with JIS K2283. When the viscosity of the sample was calculated from the obtained kinematic viscosity and the sample's specific viscosity measured in advance by use of the expression [viscosity (cP)=kinematic viscosity (cSt)×specific viscosity (G/cm³)], it was 142 cP.

Preparation of Sample

Preparation of Sample 1: The whole convex surface of a thiourethane resin plastic lens (MR) was subjected to an atmospheric pressure plasma treatment for 90 seconds by use of atmosphericpressure plasma irradiation equipment (ST-7000 of KEYENCE CORPORATION), and the convex surface was then washed with about 2 ml of hot water of 40° C. Then, the photocuring coating agent A was spin-coated by use of the spin-coater 1H-DX2 of MIKASA CO., LTD. with the revolution speed gradually increased (i.e., at 60 r.p.m for 40 seconds, 400 r.p.m for 2 seconds, and then 600 r.p.m for 4 seconds). Then, the lens was held with the convex surface coated with the coating agent A' facing upward and then exposed to a metal halide lamp equipped with a cold reflector with an exposure intensity of about 100 mW/cm² in a nitrogen gas atmosphere for 180 seconds so as to cure the coating agent A'. Then, the lens was held with the convex surface facing downward and then heated at 120° C. for 1 hour. The thickness of the coating layer (coating layer A') formed on the plastic lens was measured by use of thin film measuring equipment of Filmetrics Japan, Inc. By using this lens as a sample (sample 1), an adhesion test 1 for evaluating adhesion between the lens and the coating layer which will be described later was carried out.

Preparation of Sample 2: Another plastic lens having a coating layer (coating layer A') comprising the cured product of the coating agent A' was obtained in the same manner as the sample 1 was produced. Then, after the thickness of the coating layer was measured, the plastic lens was washed with acetone and then fully air-dried so as to be clean. Then, the plastic lens was immersed in a 10% NaOH aqueous solution for 10 minutes, and the plastic lens was then fully washed with water and air-dried again. This lens was immersed in a coating agent for hard coat (hard coat solution TS56H of Tokuyama Corporation), pulled out at 30 cm/min, pre-dried at 60° C. for 15 minutes and heated at 130° C. for 2 hours so as to cure the coating agent. Thereby, a sample (sample 2) having the hard coat layer was prepared.

Preparation of Sample 3: A sample 3 was prepared in the same manner as the sample 2.

Evaluations of Samples (1) Adhesion between Lens and Coating Layer A' (hereinafter also referred to as "adhesion 1")

On the surface of the coating layer of the sample 1 which had been left to stand at room temperature for 0.5 to 24 hours after cured, 100 grids each having a size of 1 mm×1 mm were formed by use of a cutter knife. Subsequently, a grid test in which a commercially available scotch tape was stuck on the grids and the degree of peeling of the coating layer when the scotch tape was peeled off quickly was observed visually was conducted so as to evaluate adhesion between the lens and the coating layer. The evaluation was made based on the number of unpeeled grids out of the 100 grids, i.e., on the following 5 scale.

◎: (number of unpeeled grids after evaluation)/(number of grids before evaluation=100)=100/100
○: 99 to 95/100
Δ: 94 to 80/100
▲: 79 to 50/100
×: 49 or less/100

The results are shown in Table 9 together with the results of other Reference Examples.

(2) Adhesion between Coating Layer A1 and Hard Coat Layer (hereinafter also referred to as "adhesion 2")

On the surface of the sample 2 which had been left to stand at room temperature for 0.5 to 24 hours after formation of the hard coat layer, 100 grids each having a size of 1 mm×1 mm were formed by use of a cutter knife, and a grid test was conducted as in the above (1) so as to evaluate adhesion 2. The results are shown in Table 9 together with the results of other Reference Examples. The number of unpeeled grids in this case refers to the number of grids where neither the coating layer A' nor the hard coat layer was peeled off.

(3) Adhesion after Humidity Test

After the sample 3 had been left to stand at a temperature of 40° C. and a humidity of 90% RH for 1 week and 1 month after formation of the hard coat layer, a grid test was conducted as in the above (1). Adhesion after 1 week from the humidity test was taken as adhesion 3, and adhesion after 1 month from the humidity test was taken as adhesion 4. The results are shown in Table 9 together with the results of other Reference Examples. The number of unpeeled grids in the evaluation refers to the number of grids where neither the coating layer A' nor the hard coat layer was peeled off as in the above (2).

Reference Examples 12 to 27

The components shown in Table 7 were mixed in the same manner as the coating agent A' was produced so as to obtain photocuring coating agents B' to H' comprising compositions of the present invention.

Samples were prepared in the same manner as in Reference Example 11 except that the coating agents and lens substrates shown in Table 9 were used and the pretreatments for the lens substrates shown in Table 9 were used, and the samples were evaluated. The results of the evaluations are shown in Table 9. Specific methods of the pretreatments shown in Table 9 are as follows.

Methods of Pretreatments of Lens Substrate (1) Atmospheric Pressure Plasma Treatment (described as "Plasma" in Table 9)

The whole convex surface of the lens substrate was subjected to an atmospheric pressure plasma treatment for 90 seconds by use of atmospheric pressure plasma irradiation equipment (ST-7000 of KEYENCE CORPORATION), and the convex surface was then washed with about 2 ml of hot water of 40° C. and then air-dried.

(2) Corona Discharge Treatment (described as "Corona" in Table 9)

The whole convex surface of the lens substrate was subjected to a corona discharge treatment for 90 seconds by use of COROJET 1000 of KYOTO ELECTRIC INSTRUMENT CO., LTD.

(3) Treatment with Alkali Aqueous Solution (described as "Alkali" in Table 9)

After the lens substrate was immersed in a 10% sodium hydroxide aqueous solution heated to 50° C. for 6 minutes, the substrate was washed with running water for about 10 minutes and then dried in an oven at 80° C. for 20 minutes.

(4) Treatment with Polishing Agent (described as "Polishing" in Table 9)

Alumina particles having a particle diameter of about 1 μm were dispersed in distilled water, and the solution was applied to a piece of cloth with which the whole convex surface of the lens substrate was rubbed. Then, the substrate was washed with running water and then dried in an oven at 80° C. for 20 minutes.

Comparative Examples 15 to 20

The components shown in Table 8 were mixed in the same manner as the coating agent A' was produced so as to obtain photocuring coating agents T' and U'. T' and U' are coating agents for comparative experiments containing no maleimide compound.

Samples were prepared in the same manner as in Reference Example 11 except that the coating agents and lens substrates shown in Table 10 were used and the pretreatments for the lens substrates shown in Table 10 were used, and the samples were evaluated. The results of the evaluations are shown in Table 10. As for Comparative Examples 16 to 18, only adhesion 1 was evaluated.

TABLE 7

| Coating Agent | Component (A2) (parts by weight) | Component (A1) (parts by weight) | Component (B1) (parts by weight) | Component (C1) (parts by weight) |
|---|---|---|---|---|
| A' | BMI-1 1.5 | — | — | TMPT/BPEO/9GA/U6A/GMA 18.5/30/20/20/10 |
| B' | BMI-1 1 | — | — | TMPT/BPEO/9GA/GMA 10/60/20/9 |
| C' | BMI-2 2 | — | — | TMPT/BPE/U6A/MePEGMA/GMA 10/48/15/15/10 |
| D' | PMI 5 | — | — | TMPT/BPEO/9GA/GMA 10/30/15/5 |
| E' | LMI 10 | — | — | TMPT/BPE/U6A/9GA/GMA 10/10/30/20/20 |
| F' | BMI-1 1 | TMSiMA 10 | — | TMPT/BPEO/U6A/9GA/GMA 10/35/14/20/10 |
| G' | BMI-1 1 | DMSiMA 10 | HP 10 | TMPT/9GA/U6A/GMA 20/24/25/10 |
| H' | LMI 5 | MOI 7 | EBA/HOA 10/5 | TMPT/BPEO/9GA/GMA 10/30/15/18 |
| I' | BMI-1 1 | — | — | TMPT/BPEO/9GA/U6A/GMA 15/40/14/20/10 |
| J' | BMI-1 1 | — | — | BPE/MePEGMA/U6A/GMA 50/20/15/14 |
| K' | BMI-1 0.5 | TMSiMA 10 | — | BPEO/9GA/U6A/GMA 45/20/15/9.5 |
| L' | BMI-1 1.5 | TMSiMA 10 | HP/EB6A 10/15 | TMPT/BPEO/9GA/GMA 10/35/13.5/5 |
| M' | BMI-2 1 | TMSiMA 10 | HP 10 | TMPT/BPEO/9GA/U6A/GMA 10/20/20/24/5 |
| N' | PMI 3 | TMSiMA 10 | FA3/HOB 10/10 | TMPT/9GA/U6A/GMA 15/20/30/2 |

| Coating Agent | Amine Compound (parts by weight) | Polymerization Initiator (parts by weight) | Stabilizer (parts by weight) | Chromene Compound (parts by weight) | Viscosity (cP) |
|---|---|---|---|---|---|
| A' | NMDEA 3 | CGI1800 0.2 | LS765 5 | — | 142 |

TABLE 7-continued

| | | | | | |
|---|---|---|---|---|---|
| B' | NMDEA 5 | CGI1800 0.3 | LS765 5 | — | 106 |
| C' | NMDEA 5 | CGI1800 0.2 | LS765 5 | — | 130 |
| D' | DMEMA 5 | CGI1800 0.2 | LS765 5 | — | 123 |
| E' | NMDEA 5 | CGI1800 0.2 | LS765 5 | — | 113 |
| F' | NMDEA 3 | CGI1800 0.2 | LS765 5 | — | 109 |
| G' | NMDEA 1 | CGI1800 0.5 | LS765 5 | — | 135 |
| H' | NMDEA 5 | CGI1800 0.5 | LS765 5 | — | 158 |
| I' | NMDEA 3 | CGI1800 0.5 | LS765 5 | C1 3 | 118 |
| J' | NMDEA 5 | CGI1800 0.45 | LS765 5 | C1 3 | 128 |
| K' | NMDEA 3 | CGI1800 0.4 | LS765 5 | C2 3 | 111 |
| L' | DMEMA 3 | CGI1800 0.5 | LS765 5 | C1 3 | 115 |
| M' | NMDEA 5 | CGI1800 0.5 | LS765 5 | C3 3 | 131 |
| N' | NMDEA 5 | CGI1800 0.5 | LS765 5 | C4 3 | 145 |

TABLE 8

| | | Component (B2) | | |
|---|---|---|---|---|
| Coating Agent | Component (A2) (parts by weight) | Component (A1) (parts by weight) | Component (B1) (parts by weight) | Component (C1) (parts by weight) |
| O' | BMI-1 1.5 | TMSiMA 5 | DPCA 8.5 | TMPT/BPEO/9GA/GMA 10/40/25/10 |
| P' | BMI-1 1 | TMSiMA 10 | HP/EB6A 5/10 | BPEO/9GA/U6A/GMA 40/15/9/10 |
| Q' | BMI-1 2 | DMSiMA 10 | EBA 15 | TMPT/BPE/U6A/GMA 15/40/9/9 |
| R' | BMI-1 5 | TMSiMA 15 | EBA/EB6A 10/15 | TMPT/BPE/MePEGMA/GMA 5/25/15/10 |
| S' | BMI-1 1 | DMSiMA 10 | HP/EB6A 10/15 | TMPT/BPEO/9GA/GMA 10/30/19/5 |
| T' | — | — | — | TMPT/BPEO/U6A/9GA/GMA 20/40/10/20/10 |
| U' | — | TMSiMA 10 | HP 5 | TMPT/BPE/9GA/U6A/GMA 5/50/10/15/5 |
| W' | LMI 5 | TMSiMA 5 | HP 10 | TMPT/BPE/9GA/U6A 10/45/10/15 |
| X' | — | DMSiMA 30 | — | TMPT/BPEO/U6A/MePEGMA/GMA 10/10/30/10/9 |

| Coating Agent | Amine Compound (parts by weight) | Polymerization Initiator (parts by weight) | Stabilizer (parts by weight) | Chromene Compound (parts by weight) | Viscosity (cP) |
|---|---|---|---|---|---|
| O' | NMDEA 3 | CGI1800 0.5 | LS765 5 | C5 3 | 106 |
| P' | DMEMA 7 | CGI1800 0.45 | LS765 5 | C6 3 | 112 |
| Q' | NMDEA 10 | CGI1800 0.5 | LS765 5 | C7 3 | 117 |
| R' | DMEMA 5 | CGI1800 0.5 | LS765 5 | C8 3 | 121 |
| S' | NMDEA 5 | CGI1800 0.5 | LS765 5 | C4/C7/C8 0.5/1.5/2 | 105 |
| T' | NMDEA 3 | CGI1800 0.2 | LS765 5 | — | 121 |
| U' | NMDEA 5 | CGI1800 0.25 | LS765 5 | — | 118 |
| W' | NMDEA 30 | CGI1800 0.5 | LS765 5 | C1 3 | 110 |
| X' | DMEMA 5 | CGI1800 0.5 | LS765 5 | C8 3 | 127 |

TABLE 9

| Reference Example | Coating Agent | Lens Substrate | Pretreatment Method | Film Thickness (μm) | Adhesion 1 | Adhesion 2 | Adhesion 3 | Adhesion 4 |
|---|---|---|---|---|---|---|---|---|
| 11 | A' | MR | Plasma | 40 | ◎ | ○ | ◎ | ◎ |
| 12 | A' | CR39 | Plasma | 41 | ○ | ○ | ○ | △ |
| 13 | A' | TE | Plasma | 40 | ◎ | ◎ | ◎ | ◎ |
| 14 | A' | SPL | Plasma | 40 | ◎ | ○ | ○ | △ |
| 15 | A' | TR | Plasma | 39 | ○ | ◎ | ○ | ○ |
| 16 | B' | MR | Plasma | 33 | ◎ | ○ | ◎ | ◎ |
| 17 | C' | MR | Alkali | 38 | ◎ | ○ | ◎ | ◎ |
| 18 | D' | TR | Corona | 37 | ○ | ◎ | ◎ | ○ |
| 19 | E' | SPL | Plasma | 35 | ◎ | ○ | ○ | △ |
| 20 | F' | MR | Alkali | 33 | ◎ | ◎ | ◎ | ◎ |
| 21 | G' | MR | Polishing | 40 | ◎ | ◎ | ◎ | ◎ |
| 22 | G' | CR39 | Plasma | 39 | ◎ | ◎ | ◎ | ○ |
| 23 | G' | TE | Corona | 38 | ◎ | ◎ | ◎ | ◎ |
| 24 | G' | SPL | Corona | 39 | ◎ | ◎ | ◎ | ○ |
| 25 | G' | TR | Plasma | 39 | ◎ | ◎ | ◎ | ◎ |
| 26 | H' | MR | Alkali | 42 | ◎ | ◎ | ◎ | ◎ |
| 27 | H' | TE | Alkali | 41 | ◎ | ◎ | ◎ | ◎ |

TABLE 10

| Comparative Example | Coating Agent | Lens Substrate | Pretreatment Method | Film Thickness (μm) | Adhesion 1 | Adhesion 2 | Adhesion 3 | Adhesion 4 |
|---|---|---|---|---|---|---|---|---|
| 15 | T' | MR | Plasma | 37 | ▲ | X | — | — |
| 16 | T' | CR39 | Plasma | 38 | X | — | — | — |
| 17 | T' | TE | Plasma | 39 | X | — | — | — |
| 18 | T' | SPL | Plasma | 37 | X | — | — | — |
| 19 | T' | TR | Plasma | 37 | ▲ | X | — | — |
| 20 | U' | MR | Corona | 35 | ◎ | ◎ | ◎ | X |

As is clear from the above Table 9, the coating films obtained by use of the coating agents of Reference Examples 11 to 27 show good adhesion (adhesion 1) to the lens substrates, good adhesion (adhesion 2) to the hard coat layers, and good adhesion (adhesion 3) one week from after the humidity tests. However, since the compositions used in Reference Examples 11 to 19 contain no silyl monomers, a tendency that the adhesions 2 and the adhesions (adhesion 4) after 1 month from the humidity tests are slightly degraded is seen in Reference Examples 11 to 19 as compared with Reference Examples 20 to 27 using the silyl monomers. When the silyl monomers are not used, slight deteriorations in the adhesions are seen; however, since containing the maleimide compounds, the compositions have very good adhesions. Meanwhile, as shown by the results of Comparative Examples 15 to 20 in Table 10, when no maleimide compounds are contained in the coating agents, satisfactory adhesion 4 is not obtained. In particular, as shown in Comparative Examples 15 to 19, when no maleimide compounds, no silyl monomers and no ester-linkage-containing monomers are contained in the coating agents, even adhesion 1 is not satisfactory.

Examples 19 to 37

The components shown in Tables 7 and 8 were mixed in the same manner as the coating agent A' was obtained so as to obtain photocuring coating agents I' to S' comprising the compositions of the present invention containing photochromic compounds. Then, samples 1 to 3 were prepared in the same manner as in Reference Example 11 except that the coating agents and lens substrates shown in Table 11 were used and the pretreatment methods shown in Table 11 were used, and the samples 1 were measured for various photochromic properties (a maximum absorption wavelength, a developed color density, a color fading rate and durability). Further, the adhesions 1 to 4 of the above samples 1 to 3 were evaluated as in Reference Example 11. The results are shown in Table 11.

TABLE 11

| Example | Coating Agent | Lens Substrate | Pretreatment Method | Film Thickness (μm) | Adhesion 1 | Adhesion 2 | Adhesion 3 | Adhesion 4 |
|---|---|---|---|---|---|---|---|---|
| 19 | I' | MR | Plasma | 37 | ◎ | ○ | ◎ | ○ |
| 20 | I' | CR39 | Plasma | 38 | ◎ | ○ | ○ | △ |
| 21 | I' | TE | Plasma | 38 | ◎ | ◎ | ◎ | ◎ |
| 22 | I' | SPL | Plasma | 36 | ○ | ○ | ○ | △ |
| 23 | I' | TR | Plasma | 38 | ○ | ○ | ○ | △ |
| 24 | J' | MR | Alkali | 40 | ◎ | ◎ | ◎ | ○ |
| 25 | K' | TR | Corona | 35 | ◎ | ◎ | ◎ | △ |
| 26 | L' | TE | Corona | 36 | ○ | ○ | ○ | ◎ |
| 27 | M' | SPL | Plasma | 41 | ◎ | ◎ | ◎ | ◎ |
| 28 | N' | MR | Plasma | 43 | ◎ | ◎ | ◎ | ◎ |
| 29 | O' | CR39 | Corona | 35 | ◎ | ◎ | ◎ | ◎ |
| 30 | P' | MR | Polishing | 35 | ◎ | ◎ | ◎ | ◎ |

TABLE 11-continued

| | | | | | | | | |
|---|---|---|---|---|---|---|---|---|
| 31 | Q' | MR | Alkali | 37 | ◎ | ◎ | ◎ | ◎ |
| 32 | R' | TE | Alkali | 39 | ◎ | ◎ | ◎ | ◎ |
| 33 | S' | MR | Plasma | 36 | ◎ | ◎ | ◎ | ◎ |
| 34 | S' | CR39 | Plasma | 35 | ◎ | ◎ | ◎ | ◎ |
| 35 | S' | TE | Plasma | 36 | ◎ | ◎ | ◎ | ◎ |
| 36 | S' | SPL | Plasma | 36 | ◎ | ◎ | ◎ | ◎ |
| 37 | S' | TR | Plasma | 35 | ◎ | ◎ | ◎ | ◎ |

| Example | ($\lambda$max) (nm) | Developed Color Density | Color Fading Half Life (min) | Durability (%) |
|---|---|---|---|---|
| 19 | 610 | 0.80 | 1.2 | 42 |
| 20 | 610 | 0.82 | 1.2 | 44 |
| 21 | 610 | 0.81 | 1.4 | 42 |
| 22 | 610 | 0.76 | 1.3 | 40 |
| 23 | 610 | 0.80 | 1.2 | 43 |
| 24 | 610 | 0.83 | 1.1 | 41 |
| 25 | 600 | 0.72 | 1.4 | 38 |
| 26 | 610 | 0.75 | 1.1 | 41 |
| 27 | 588 | 0.88 | 1.7 | 45 |
| 28 | 474 | 0.92 | 1.6 | 37 |
| 29 | 576 | 0.72 | 1.6 | 34 |
| 30 | 580 | 0.83 | 1.1 | 35 |
| 31 | 446 | 0.94 | 1.8 | 39 |
| 32 | 586 | 1.05 | 1.7 | 40 |
| 33 | 480 | 0.83 | 1.7 | 40 |
|    | 590 | 1.05 | 1.7 | 43 |
| 34 | 480 | 0.85 | 1.6 | 39 |
|    | 590 | 1.05 | 1.7 | 43 |
| 35 | 478 | 0.83 | 1.6 | 38 |
|    | 590 | 1.00 | 1.6 | 41 |
| 36 | 480 | 0.80 | 1.7 | 42 |
|    | 590 | 0.96 | 1.7 | 45 |
| 37 | 480 | 0.81 | 1.7 | 38 |
|    | 590 | 0.98 | 1.7 | 40 |

Comparative Examples 21 to 26

The components shown in Table 2 were mixed in the same manner as the coating agent A' was obtained so as to obtain photocuring coating agents W' and X' containing photochromic compounds. Then, samples 1 to 3 were prepared in the same manner as in Reference Example 11 except that the coating agents and lens substrates shown in Table 12 were used and the pretreatment methods for the lens substrates shown in Table 12 were used, and the samples 1 were measured for various photochromic properties (a maximum absorption wavelength, a developed color density, a color fading rate and durability) in the same manner as in Examples 19 to 37. Further, the adhesions 1 to 4 of the above samples 1 to 3 were evaluated as in Reference Example 11. The results are shown in Table 12.

TABLE 12

| Comparative Example | Coating Agent | Lens Substrate | Film Thickness (μm) | Adhesion 1 | Adhesion 2 | Adhesion 3 | Adhesion 4 |
|---|---|---|---|---|---|---|---|
| 21 | W' | MR | 37 | ◎ | ◎ | Δ | X |
| 22 | W' | CR39 | 36 | ○ | ○ | Δ | X |
| 23 | W' | TE | 36 | ○ | ◎ | Δ | X |
| 24 | W' | SPL | 35 | ◎ | ◎ | Δ | X |
| 25 | W' | TR | 34 | ○ | ◎ | Δ | X |
| 26 | X' | MR | 39 | ◎ | ◎ | ▲ | X |

| Comparative Example | ($\lambda$max) (nm) | Developed Color Density | Color Fading Half Life (min) | Durability (%) |
|---|---|---|---|---|
| 21 | 610 | 0.82 | 1.0 | 5 |
| 22 | 610 | 0.79 | 0.9 | 5 |
| 23 | 610 | 0.80 | 0.8 | 9 |
| 24 | 610 | 0.80 | 1.0 | 7 |
| 25 | 610 | 0.77 | 1.0 | 3 |
| 26 | 586 | 0.95 | 2.5 | 8 |

As is clear from the above Table 11, the photochromic properties and adhesions of the samples (photochromic plastic lenses) prepared by use of the second coating compositions in Examples 19 to 37 are satisfactorily good. Meanwhile, as shown in Table 12, in the case of Comparative Examples 21 to 25, since the photocuring coating composition (coating agent W') contains the maleimide compound and the like as radical polymerizable monomers, the adhesions are not degraded very much, but the durabilities which are one of photochromic properties are significantly degraded because the composition contains the amine compound in an amount larger than that defined in the present invention. Further, in the case of Comparative Example 26, since the photocuring coating composition (coating agent X') contains no maleimide compound and contains the silyl monomer in an amount larger than that defined in the present invention, the adhesions are degraded, and the photochromic properties are also degraded.

Example 38

A sample (coating layer thickness: 39 μm) was prepared in the same manner as in Example 19 except that a coating composition having the same composition as that of the composition I' except for having no amine compound was used and that a substrate having an adhesive layer formed thereon was used, and adhesion tests were conducted and evaluations of photochromic properties were made on the sample. The results are as follows: adhesion 1=◉, adhesion 2=◉, adhesion 3=◉, adhesion 4=○, λmax=610 (nm), developed color density=0.76, color fading half life=1.4 (min), durability=43%. The adhesive layer was formed in the following manner. That is, firstly, the whole convex surface of a thiourethane resin plastic lens (MR) was subjected to an atmospheric pressure plasma treatment for 60 seconds by use of atmospheric pressure plasma irradiation equipment (ST-7000 of KEYENCE CORPORATION). Then, UT20 was spin-coated by use of the spin-coater 1H-DX2 of MIKASA CO., LTD. with the revolution speed changed stepwise (i.e., at 50 r.p.m for 20 seconds, 1,500 r.p.m for 5 seconds and 600 r.p.m for 4 seconds). Then, the lens was held with the convex surface coated with UT20 facing upward and exposed to a metal halide lamp equipped with a cold reflector with an exposure intensity of about 100 mW/cm² in a nitrogen gas atmosphere for 120 seconds so as to cure UT20. Thereby, the adhesive layer was formed.

It is understood from this result that even if a second coating composition containing no amine compound is used, a photochromic coating layer having good adhesion and good photochromic properties can be obtained when a substrate having an adhesive layer is used.

Comparative Example 27

A sample (coating layer thickness: 37 μm) was prepared in the same manner as in Example 38 except that a coating composition having the same composition as that of the composition I' except for having no component A2 and no amine compound was used, and adhesion tests were conducted and evaluations of photochromic properties were made on the sample. The results are as follows: adhesion 1=◉, adhesion 2=○, adhesion 3=Δ, adhesion 4=▲, λmax=610 (nm), developed color density=0.78, color fading half life=1.3 (min), durability=41%. It is understood from this result that even when a substrate coated with an adhesive is used, satisfactory adhesions cannot be obtained, particularly when a coating composition containing no component (A2) (maleimide compound) is used.

As described above with reference to Examples, the compositions of the present invention can be applied to the surface of an optical material substrate such as a plastic lens and cured so as to form a coating layer having good adhesion to the substrate. Further, the coating layer also has good adhesion to a hard coat layer which may be formed on the coating layer and never comes off from the substrate when the substrate having the coating layer formed thereon is stored under high humidity conditions for a long time. In addition, cured products obtained by curing the compositions of the present invention which contain photochromic compounds show good photochromic properties. Thus, such compositions of the present invention are excellent as a coating agent (coating agent for imparting photochromic properties) in producing a photochromic plastic lens by a coating method.

The invention claimed is:

1. A coating composition comprising:
   100 parts by weight of radical polymerizable monomer which comprises:
   (A1) 0.1 to 20 wt % of at least one radical polymerizable monomer selected from the group consisting of a radical polymerizable monomer having a silanol group or a group which produces a silanol group through hydrolysis and a radical polymerizable monomer having an isocyanate group,
   (B1) 0.1 to 50 wt % of radical polymerizable monomer other than the component (A1), said component (B1) selected from the group consisting of compounds represented by the following formula (7), compounds represented by the following formula (10), and hydroxypivalic acid neopentylglycol diacrylate,

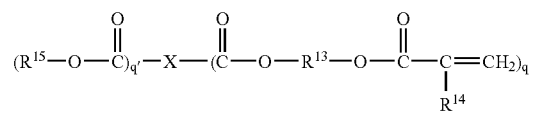

(7)

wherein $R^{13}$ is an alkylene group having 1 to 10 carbon atoms which may have a substituent, $R^{14}$ is a hydrogen atom or a methyl group, $R^{15}$ is hydrogen or an alkyl group having 1 to 10 carbon atoms which may have a substituent, X is a divalent organic residue, q is 1 or 2, and q' is 0 or 1, provided that q+q'=2,

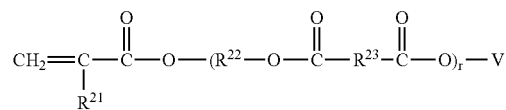

(10)

wherein $R^{21}$ is a hydrogen atom or a methyl group, $R^{22}$ and $R^{23}$ are each independently an alkylene group having 1 to 10 carbon atoms, V is a hydrogen atom or a group represented by the following formula (11):

(11)

wherein $R^{24}$ is an alkylene group having 1 to 10 carbon atoms, and U is an alkyl group having 1 to 10 carbon atoms, a hydrogen atom, a benzene ring or a (meth) acryloyloxy group, and r is an integer of 1 to 10, and
   (C1) 30 to 99.8 wt % of another radical polymerizable monomer different from the components (A1) and (B1),
   (D1) 0.01 to 20 parts by weight of photochromic compound, and
either no amine compound or up to 20 parts by weight of amine compound.

2. The composition of claim 1, comprising the amine compound in an amount of 0.1 to 20 parts by weight.

3. A coating composition comprising:
   100 parts by weight of radical polymerizable monomer mixture which comprises:
   (A2) 0.01 to 20 wt % of maleimide compound, and
   (B2) 80 to 99.99 wt % of another radical polymerizable compound different from the component (A2), (D1) 0.01 to 20 parts by weight of photochromic compound, and
either no amine compound or up to 20 parts by weight of amine compound.

4. The composition of claim 3, wherein based on the weight of all radical polymerizable monomers, the component (B2) comprises:
(i) (A1) 0.1 to 20 wt % of at least one radical polymerizable monomer selected from the group consisting of a radical polymerizable monomer having a silanol group or a group which produces a silanol group through hydrolysis and a radical polymerizable monomer having an isocyanate group,
(B1) 0.1 to 50 wt % of radical polymerizable monomer other than the component (A1),
said component (B1) selected from the group consisting of compounds represented by the following formula (7), compounds represented by the following formula (10), and hydroxypivalic acid neopentylglycol diacrylate,

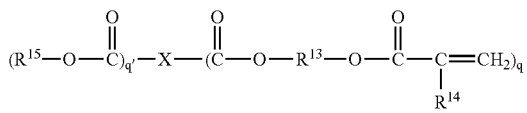
(7)

wherein $R^{13}$ is an alkylene group having 1 to 10 carbon atoms which may have a substituent, $R^{14}$ is a hydrogen atom or a methyl group, $R^{15}$ is hydrogen or an alkyl group having 1 to 10 carbon atoms which may have a substituent, X is a divalent organic residue, q is 1 or 2, and q' is 0 or 1, provided that q+q'=2,

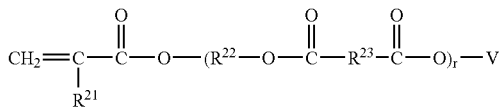
(10)

wherein $R^{21}$ is a hydrogen atom or a methyl group, $R^{22}$ and $R^{23}$ are each independently an alkylene group having 1 to 10 carbon atoms, V is a hydrogen atom or a group represented by the following formula (11):

(11)

wherein $R^{24}$ is an alkylene group having 1 to 10 carbon atoms, and U is an alkyl group having 1 to 10 carbon atoms, a hydrogen atom, a benzene ring or a (meth) acryloyloxy group, and r is an integer of 1 to 10, and (C1) 10 to 99.79 wt % of another radical polymerizable monomer different from the components (A1) and (B1), or (ii) 0.1 to 20 wt % of the component (A1) and 60 to 99.89 wt % of the component (C1), or (iii) 0.1 to 50 wt % of the component (B1) and 30 to 99.8 wt % of the component (C1), or (iv) 80 to 99.99 wt % of the component (C1).

5. The composition of claim 3 or 4, comprising the amine compound in an amount of 0.1 to 20 parts by weight.

6. An optical article having a coating layer formed on at least one surface of a light transmittable substrate, the coating layer comprising a cured product of the composition of claim 1.

7. An optical article having a coating layer formed on at least one surface of a light transmittable substrate, the coating layer comprising a cured product of the composition of claim 3.

8. A method for coating a light transmittable substrate, comprising the step of:
coating the composition of claim 1 onto said light transmittable substrate.

9. A method for coating a light transmittable substrate, comprising the step of:
coating the composition of claim 3 onto said light transmittable substrate.

* * * * *